United States Patent
Chang et al.

(10) Patent No.: US 12,432,344 B2
(45) Date of Patent: Sep. 30, 2025

(54) INTRA CHROMA MODE LIST CONSTRUCTION FOR VIDEO CODING

(71) Applicant: QUALCOMM Incorporated, San Diego, CA (US)

(72) Inventors: Yao-Jen Chang, San Diego, CA (US); Keming Cao, San Diego, CA (US); Bappaditya Ray, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 18/187,517

(22) Filed: Mar. 21, 2023

(65) Prior Publication Data
US 2023/0336716 A1    Oct. 19, 2023

Related U.S. Application Data

(60) Provisional application No. 63/362,939, filed on Apr. 13, 2022.

(51) Int. Cl.
*H04N 19/11* (2014.01)
*H04N 19/176* (2014.01)
*H04N 19/186* (2014.01)

(52) U.S. Cl.
CPC .......... *H04N 19/11* (2014.11); *H04N 19/176* (2014.11); *H04N 19/186* (2014.11)

(58) Field of Classification Search
CPC .... H04N 19/176; H04N 19/11; H04N 19/593; H04N 19/159; H04N 19/105;
(Continued)

(56) References Cited

U.S. PATENT DOCUMENTS

| | | | |
|---|---|---|---|
| 2005/0157797 A1* | 7/2005 | Gaedke | H04N 19/593 375/E7.176 |
| 2012/0314766 A1* | 12/2012 | Chien | H04N 19/186 375/E7.243 |
| 2017/0353730 A1* | 12/2017 | Liu | H04N 19/159 |

FOREIGN PATENT DOCUMENTS

| | | |
|---|---|---|
| EP | 3654645 A1 | 5/2020 |
| WO | 2021244935 A1 | 12/2021 |

OTHER PUBLICATIONS

Jianle Chen; Title: Algorithm Description of Joint Exploration Test Model 7 (JEM 7), Joint Video Exploration Team (JVET)of ITU-T SG 16 WP 3 and ISO/IEC JTC 1/SC 29/WG 11 (Year: 2017).*

(Continued)

*Primary Examiner* — Masum Billah
(74) *Attorney, Agent, or Firm* — Shumaker & Sieffert, P.A.

(57) ABSTRACT

A method of encoding or decoding video data includes constructing a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; determining an intra-prediction mode for the chroma block from the list of chroma intra-prediction modes; and encoding or decoding the chroma block based on the intra-prediction mode.

24 Claims, 14 Drawing Sheets

(58) Field of Classification Search
CPC .... H04N 19/70; H04N 19/119; H04N 19/132; H04N 19/147
USPC .......................................................... 375/240
See application file for complete search history.

(56) References Cited

OTHER PUBLICATIONS

Abdoli M., et al., "Non-CE3: Decoder-Side Intra Mode Derivation (DIMD) with Prediction Fusion Using Planar", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0449-V2, m48570, Jul. 4, 2019, XP030219611, XP030219610, pp. 1-9.

Chang Y-J., et al., "Non-EE2: Chroma Intra Modes Derived from Collocated Luma Blocks and Neighboring Chroma Blocks", JVET-Z0143-v2, Joint Video Experts Team (JVET) of ITU-T SG 16 WP 3 and ISO/IEC JTC 1/SC 29, 26th Meeting, by teleconference, Apr. 20-29, 2022, pp. 1-4.

Coban M., et al., "Algorithm Description of Enhanced Compression Model 3 (ECM 3)", JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Li X., et al., "Non-EE2: On chroma intra prediction mode", JVET-Y0092-v3, Joint Video Experts Team (JVET) of ITU-T SG 16 WP 3 and ISO/IEC JTC 1/SC 29, 25th Meeting, by teleconference, Jan. 12-21, 2022, pp. 1-4.

Seregin V., et al., "Exploration Experiment on Enhanced Compression beyond VVC capability (EE2)", JVET-Y2024-v2, Joint Video Experts Team (JVET) of ITU-T SG 16 WP 3 and ISO/IEC JTC 1/SC 29, 25th Meeting, by teleconference, Jan. 12-21, 2022, pp. 1-15.

Chang Y.J., et al., "Non-EE2: Chroma Intra Modes Derived from Collocated Luma Blocks and Neighboring Chroma Blocks", 26. JVET Meeting, Apr. 20, 2022-Apr. 29, 2022, Teleconference, (The Joint Video Exploration Team of ISO/IEC JTC1/SC29/WG11 And ITU-T SG.16), No. JVET-Z0143, m59476, Apr. 13, 2022, pp. 1-3, XP030301041, [retrieved on Apr. 13, 2022].

Chen J., et al., "Algorithm Description of Joint Exploration Test Model 7 (JEM7)", 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, 50 Pages, XP030023716.

Coban M., et al., "Algorithm Description of Enhanced Compression Model 4 (ECM 4)", 25. JVET Meeting, Jan. 12, 2022-Jan. 21, 2022, Teleconference, (The Joint Video Exploration Team Of ISO/IEC JTC1/SC29/WG11 and ITU-T SG. 16 ), No. JVET-Y2025, m59206 Apr. 12, 2022, XP030302168, pp. 1-32, XP030302168.

International Search Report and Written Opinion—PCT/US2023/015912—ISA/EPO—Jul. 28, 2023 (20 pp).

Wang Y., et al., "Non-EE2: Extension of TIMD to Intra Chroma Coding", 24. JVET Meeting, Oct. 6, 2021-Oct. 15, 2021, Teleconference, (The Joint Video Exploration Team of ISO/IEC JTC1/SC29/WG11 and ITU-T SG. 16 ), No. JVET-X0099_V3, m57893, Oct. 8, 2021, 2 Pages, XP030297965.

Zhang L., et al., "EE5: Multiple Direct Modes for Chroma Intra Coding", 5th JVET Meeting, Jan. 12, 2017-Jan. 20, 2017, GENEVA, (The Joint Video Exploration Team of ISO/IEC JTC1/SC29/WG11 and ITU-T SG.16, No. JVET-E0062, Jan. 13, 2017, XP030150543, pp. 1-3, XP030247571.

* cited by examiner

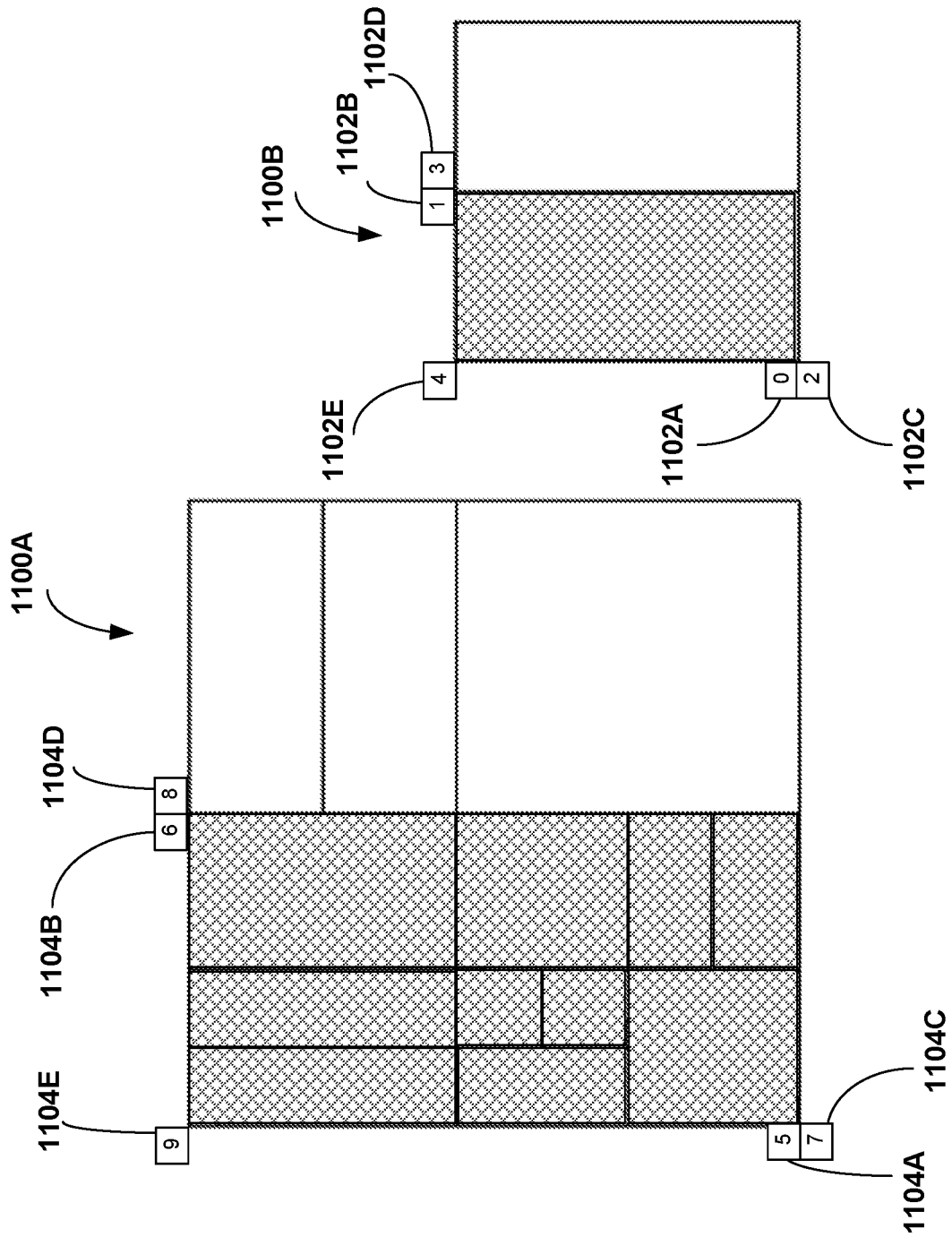

INTRA CHROMA MODE LIST CONSTRUCTION FOR VIDEO CODING

This application claims the benefit of U.S. Provisional Application No. 63/362,939, filed Apr. 13, 2022, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining an intra chroma mode (e.g., intra-prediction mode) for a chroma block. For determining an intra chroma mode, a video encoder and a video decoder may construct a list that excludes cross-component linear model (CCLM) modes, referred to as non-CCLM mode list. This disclosure describes examples of constructing one or more non-CCLM mode lists that the video encoder and the video decoder may use to determine the intra chroma mode for a chroma block (e.g., the intra-prediction mode for the chroma block). In one or more examples, the construction of the non-CCLM mode list may provide additional flexibility in the intra chroma mode that the video encoder and video decoder can select, promoting efficient compression and reduction of bandwidth utilization.

In one example, the disclosure describes a method of encoding or decoding video data, the method comprising: constructing a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; determining an intra-prediction mode for the chroma block from the list of chroma intra-prediction modes; and encoding or decoding the chroma block based on the intra-prediction mode.

In one example, the disclosure describes a device for encoding or decoding video data, the device comprising: memory configured to store the video data; and processing circuitry coupled to the memory and configured to: construct a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; determine an intra-prediction mode for the chroma block from the list of chroma intra-prediction modes; and encode or decode the chroma block based on the intra-prediction mode.

In one example, the disclosure describes a computer-readable storage medium storing instructions thereon that when executed cause one or more processors to: construct a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; determine an intra-prediction mode for the chroma block from the list of chroma intra-prediction modes; and encode or decode the chroma block based on the intra-prediction mode.

The details of one or more examples are set forth in the accompanying drawings and the description below. Other features, objects, and advantages will be apparent from the description, drawings, and claims.

BRIEF DESCRIPTION OF DRAWINGS

FIGS. 11A and 11B are conceptual diagrams illustrating a luma quad tree binary tree (QTBT) and chroma QTBT structure, respectively, with chroma modes derived from neighboring chroma and luma CUs.

DETAILED DESCRIPTION

Figure 1:
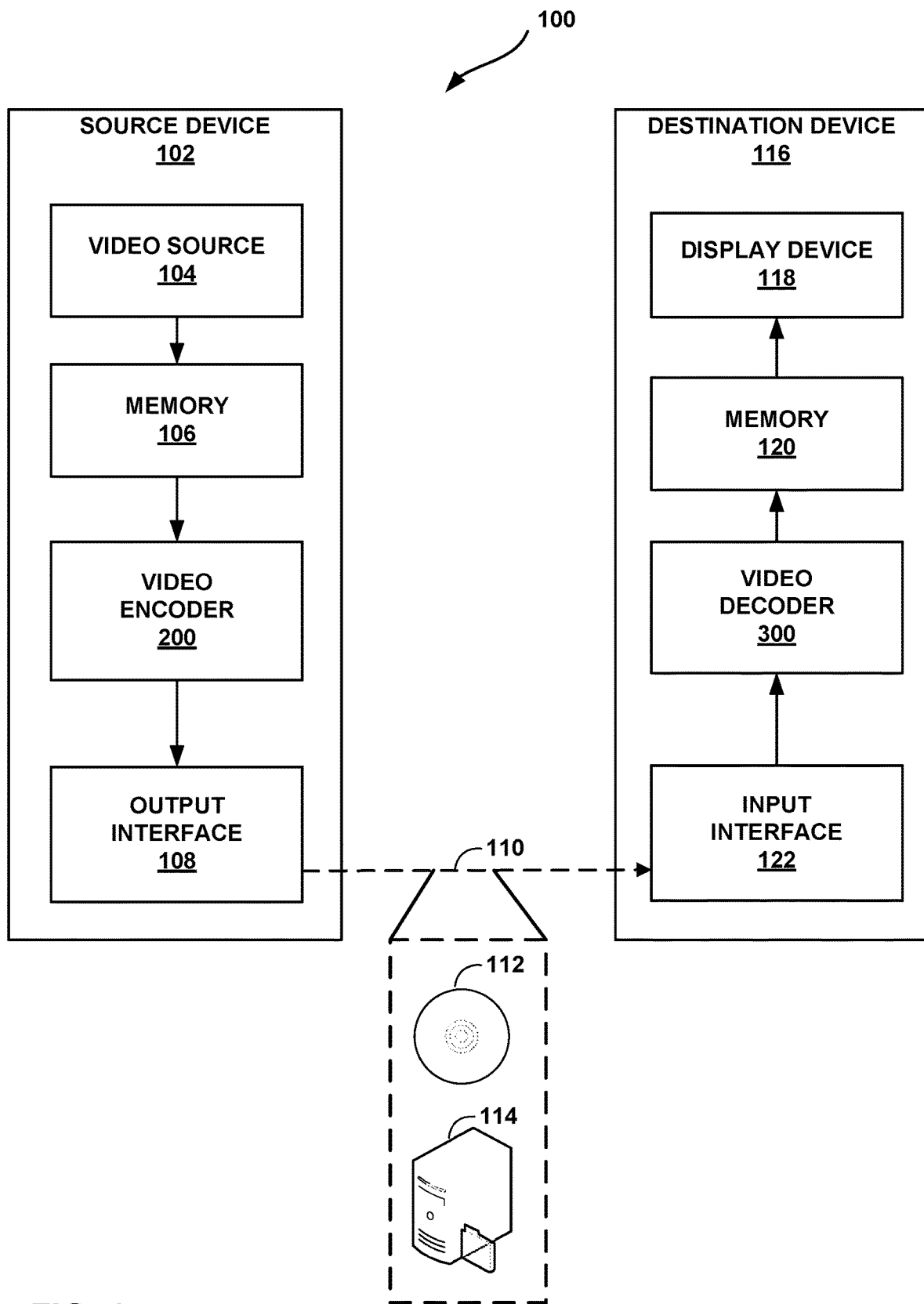
FIG. 1 is a block diagram illustrating an example video encoding and decoding system that may perform the techniques of this disclosure.

Intra-prediction mode is an example video coding tool that a video encoder and video decoder utilize to encode or decode, respectively, a current block of video data (e.g., a coding unit (CU)). In intra-prediction mode, a video encoder and a video decoder generate a prediction block based on reference samples within the same picture as the current block. There may be a plurality of intra-prediction modes that define which reference samples to use for generating the prediction block.

In one or more examples, the video encoder and the video decoder may construct one or more lists of intra-prediction modes. In some examples, the video encoder may signal an index into at least one of the lists, and the video decoder may receive the index into at least one of the lists to determine the intra-prediction mode used for generating the prediction block. However, decoder side derivation of the intra-prediction mode is also possible. The current block includes luma components represented by a luma block, and chroma components represented by a chroma block. This disclosure describes example techniques for constructing the one or more lists of intra-prediction modes for the chroma block.

For instance, there may be a plurality of intra-prediction modes (also referred to simply as intra modes) for chroma intra mode coding (e.g., for encoding or decoding a chroma block with intra-prediction). The plurality of intra-prediction modes may be categorized into two chroma mode groups (e.g., lists): cross component linear model (CCLM) mode list, and non-CCLM mode list (e.g., a group that excludes the CCLM modes). This disclosure describes example techniques for constructing the non-CCLM mode list that allows for inclusion of intra-prediction modes that may provide encoding and decoding flexibility for enhanced compression without increasing complexity to a level that negatively impacts the amount of time for encoding or decoding the current block.

In some examples, the video encoder may signal an index into the non-CCLM mode list, and the video decoder may receive the index into the non-CCLM mode list. However, the example techniques are not so limited. In some examples, the non-CCLM mode list may be part of a larger intra-prediction mode list, such as part of a primary most probable mode (PMPM) list or a second MPM (SMPM) list. In some examples, the non-CCLM mode list may be part of one single larger intra-prediction mode list (e.g., a list that includes both CCLM intra-prediction modes and non-CCLM intra-prediction modes).

Accordingly, the example techniques for constructing the non-CCLM mode list include examples in which the non-CCLM mode list is a separate list or part of a larger intra-prediction mode list. In examples where the non-CCLM mode list is part of a larger intra-prediction mode list, the video encoder and the video decoder may construct the non-CCLM mode list as part of constructing the larger intra-prediction mode list, or may separately construct the non-CCLM mode list separately and concatenate the non-CCLM mode list to the larger intra-prediction mode list.

For ease, this disclosure describes examples of constructing a list of intra-prediction coding modes for a chroma block. Examples of the list of intra-prediction coding modes include the above example lists such as the non-CCLM mode list, or where the non-CCLM mode list is part of a larger intra-prediction mode list, as a few examples.

In one or more examples, a video encoder or video decoder may evaluate one or more of intra-prediction modes of co-located luma blocks and intra-prediction modes of proximate blocks (e.g., neighboring chroma blocks or neighboring luma blocks of the co-located luma blocks). For instance, the various example intra-prediction modes may each form a group. As one example, intra-prediction modes of co-located luma blocks may be one group, intra-prediction modes of neighboring chroma blocks may be another group, and intra-prediction modes of neighboring luma blocks of the co-located luma blocks may be another group. In some examples, yet another group may be intra-prediction modes derived from intra-prediction modes in one or more of the groups.

The video encoder and the video decoder may construct the list of chroma intra-prediction modes based on the intra-prediction modes in one or more of the example groups. As an example, the video encoder and the video decoder may construct a list of chroma intra-prediction modes for a chroma block of a current block of video data. To construct the list of chroma intra-prediction modes, the video encoder and the video decoder may add intra-prediction modes of a first group to the list of chroma intra-prediction modes. The first group includes two or more intra-prediction modes derived from intra-prediction modes of two or more co-located luma blocks of the current block that are co-located with the chroma block.

In video coding, a current block includes chroma components and a luma component. The partition of the luma component into luma blocks, and the partition of the chroma component into chroma components may be different. Moreover, the chroma components may be sub-sampled relative to the luma component. Accordingly, in one or more examples, a chroma block may be co-located with two or more luma blocks of the same current block. In one or more examples, to construct the list of chroma intra-prediction modes, the video encoder and the video decoder may evaluate intra-prediction modes of two or more co-located luma blocks that are co-located with the chroma block, and add the intra-prediction modes of the two or more co-located luma blocks into the list of chroma intra-prediction modes. The intra-prediction modes of the two or more co-located luma blocks may form one group of intra-prediction modes.

Similarly, the video encoder and video decoder may evaluate intra-prediction modes of neighboring chroma blocks, and add one or more intra-prediction modes of neighboring chroma blocks to the list of chroma intra-prediction modes. The intra-prediction modes of the neighboring chroma blocks may be another group of intra-prediction modes. The video encoder and video decoder may evaluate intra-prediction modes of luma blocks neighboring the co-located luma blocks, and add one or more intra-prediction modes of luma blocks neighboring the co-located luma blocks to the list of chroma intra-prediction modes. The luma blocks neighboring the co-located luma blocks are luma blocks of blocks that neighbor the current block. The intra-prediction modes of the luma blocks neighboring the co-located luma blocks may be another group of intra-prediction modes.

In some examples, the intra-prediction modes may be defined by a numerical value. The video encoder and the video decoder may apply offsets to one or more intra-prediction modes (e.g., add or subtract an offset to the numerical values) to derive intra-prediction modes. The video encoder and the video decoder may add the derived intra-prediction modes to the list of chroma intra-prediction modes. The derived intra-prediction modes may be another group of intra-prediction modes.

The video encoder and the video decoder may determine an intra-prediction mode from the list of chroma intra-prediction modes. For instance, the video encoder may perform rate-distortion calculations to determine which intra-prediction mode in the list of chroma intra-prediction modes provides the least distortion. For the video decoder, the video encoder may signal an index into the list of chroma intra-prediction modes, and the video decoder may determine the intra-prediction mode based on the index.

For encoding or decoding the chroma block, the video encoder and video decoder may determine a prediction chroma block based on the intra-prediction mode. For decoding, the video decoder may receive residual information indicative of a difference between the prediction chroma block and the chroma block, and reconstruct the chroma block based on the residual information and the prediction chroma block. For encoding, the video encoder may generate residual information indicative of a difference between the prediction chroma block and the chroma block, and signal the residual information.

In this way, the example techniques improve the operation of intra-prediction of chroma blocks. For instance, the video encoder and video decoder may be configured to leverage intra-prediction modes of co-located or neighboring blocks to determine the intra-prediction mode for the chroma block. By constructing a list of chroma intra-prediction modes that include intra-prediction modes of co-located and/or neighboring block, as well as additional derived intra-prediction modes, bandwidth efficiencies may be achieved, as signaling index into the list of chroma intra-prediction modes may require less bandwidth as compared to signaling the actual value of the intra-prediction mode.

Also, because the list of chroma intra-prediction modes includes intra-prediction modes of co-located or neighboring blocks, the likelihood that a better intra-prediction mode for the chroma block is present in the list of chroma intra-prediction modes as compared to techniques that limit the blocks that are evaluated. Increasing the likelihood of selecting a better intra-prediction mode, as compared to other techniques, may result in generating a prediction chroma block that is a better predictor for the chroma block, as compared to other techniques. Having a better predictor for the chroma block may result in smaller valued residuals (e.g., difference between prediction chroma block and chroma block), which results in less bandwidth utilization when signaling the residual information.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra chroma mode list construction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for intra chroma mode list construction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format.

In general, video encoder 200 and video decoder 300 may be configured to perform the techniques of this disclosure in conjunction with any video coding techniques that use intra-prediction mode. For instance, as described in more detail, this disclosure describes example techniques for constructing a list of chroma intra-prediction modes for a chroma block of a current block of the video data. In some examples, the list of chroma intra-prediction modes may include intra-prediction modes from one or more groups, and constructing the list of chroma intra-prediction modes may include constructing one or more of: a first group comprising intra-prediction modes derived from intra-prediction modes of co-located luma blocks of the current block, a second group comprising intra-prediction modes derived from intra-prediction modes of proximate chroma blocks, a third group comprising intra-prediction modes derived from intra-prediction modes of luma block proximate to co-located luma blocks, and a fourth group comprising one or more of intra-prediction modes derived from intra-prediction modes of one or more of the groups, which may include direct mode (DM), Planar mode, Horizontal mode, Vertical mode, DC mode, and Diagonal mode.

The above groups are provided for example purposes only and should not be considered limiting. Moreover, not all groups may be needed in every example. For instance, video encoder 200 and video decoder 300 may construct a list of chroma intra-prediction modes for a chroma block of a current block of the video data. To construct the list of chroma intra-prediction mode, video encoder 200 and video decoder 300 may add intra-prediction modes of a first group to the list of chroma intra-prediction modes. The first group includes two or more intra-prediction modes derived from intra-prediction modes of two or more co-located luma blocks of the current block that are co-located with the chroma block. If the first group fills the list of chroma intra-prediction modes, then video encoder 200 and video decoder 300 may not construct the other groups.

In some examples, rather than starting with the example first group, video encoder 200 and video decoder 300 may start with the second group or the third group. The terms "first," "second," "third," and "fourth" groups should not be interpreted as requiring an order. Rather, the terms "first," "second," "third," and "fourth" groups are used to explain that there are different groups.

Video encoder 200 and video decoder 300 may be considered as constructing the list of chroma intra-prediction modes from one or more groups of intra-prediction modes. In some example techniques, video encoder 200 and video decoder 300 may first determine one or more of the groups, and then selectively add intra-prediction modes from the respective groups. However, the example techniques should not be considered as requiring that video encoder 200 and video decoder 300 first determine all of the groups or be configured to delineate between groups. Rather, video encoder 200 and video decoder 300 may be configured to evaluate intra-prediction modes of co-located luma blocks, proximate (e.g., neighboring) luma blocks, and/or proximate (e.g., neighboring) chroma blocks in an order, and add intra-prediction modes to the list of chroma intra-prediction modes until the list of chroma intra-prediction modes is full or based on some other constraint (e.g., based on number of intra-prediction modes for a group).

There may be limitations on how many intra-prediction modes from each group can be added into the list of chroma intra-prediction modes. For instance, there may be X intra-prediction modes of the co-located luma blocks, but video encoder 200 and video decoder 300 may only add Y of the X intra-prediction modes of the co-located luma blocks. Video encoder 20 and video decoder 300 may then add intra-prediction modes of other groups (again, it is not necessary for all groups to have been determined first). The number of intra-prediction modes of a group that can be added to the list of chroma intra-prediction modes may be predefined or signaled. As one example, video encoder 200 and video decoder 300 may add intra-prediction modes from a group to the list of chroma intra-prediction modes based on a maximum number of entries for that group, where the maximum number of entries is predefined or signaled.

One of the groups of intra-prediction modes may be derived from the other groups. For instance, video encoder 200 and video decoder 300 may derive one or more intra-prediction modes from one or more intra-prediction modes in the other groups. In this example, video encoder 200 and video decoder 300 may add intra-prediction modes of the derived one or more intra-prediction modes to the list of chroma intra-prediction modes. As one example, video encoder 200 and video decoder 300 may add or subtract an offset to the one or more intra-prediction modes in the group to derive the intra-prediction modes. For example, the intra-prediction modes may be defined by respective values, and video encoder 200 and video decoder 300 may add or subtract the offset to the respective values to derive the one or more intra-prediction modes.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra-prediction (e.g., intra frame prediction or spatial prediction) and inter prediction (e.g., inter frame prediction or temporal prediction). In the context of AV1, when predicting blocks of a current frame of video data using an intra-prediction mode, video encoder 200 and video decoder 300 do not use video data from other frames of video data. For most intra-prediction modes, video encoder 200 encodes blocks of a current frame based on the difference between sample values in the current block and predicted values generated from reference samples in the same frame. Video encoder 200 determines predicted values generated from the reference samples based on the intra-prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Versatile Video Coding (VVC), a latest video coding standard, was developed by Joint Video Experts Team (JVET) of ITU-T and ISO/IEC to achieve substantial compression capability beyond HEVC for a broad range of applications. VVC specification was finalized in July 2020 and published by both ITU-T and ISO/IEC. The VVC specification specifies normative bitstream and picture formats, high level syntax (HLS) and coding unit level syntax, and the parsing and decoding process. VVC also specifies profiles/tiers/levels (PTL) restrictions, byte stream format, hypothetical reference decoder and supplemental enhancement information (SEI) in the annex.

Starting from April 2021, JVET has been developing an Enhanced Compression Model (ECM) software, described in M. Coban, F. L. Léannec, M. G. Sarwer, and J. Ström, "Algorithm description of Enhanced Compression Model 3 (ECM 3)," JVET-X2025, January 2022, to enhance compression capability beyond VVC. The set of coding tools in the ECM software encompasses all functional blocks in the hybrid video coding framework, including intra prediction, inter prediction, transform and coefficient coding, in-loop filtering, and entropy coding. The example techniques described in this disclosure can be applied to ECM and video codecs such as VVC, AV1, etc.

Figure 6:
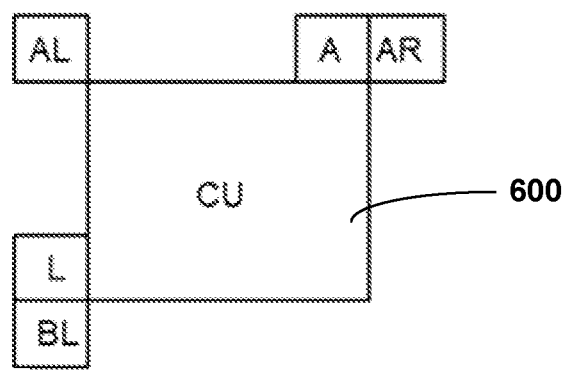
FIG. 6 is a conceptual diagram illustrating neighboring blocks used in derivation of a general most probable mode (MPM) list.
Figure 7:
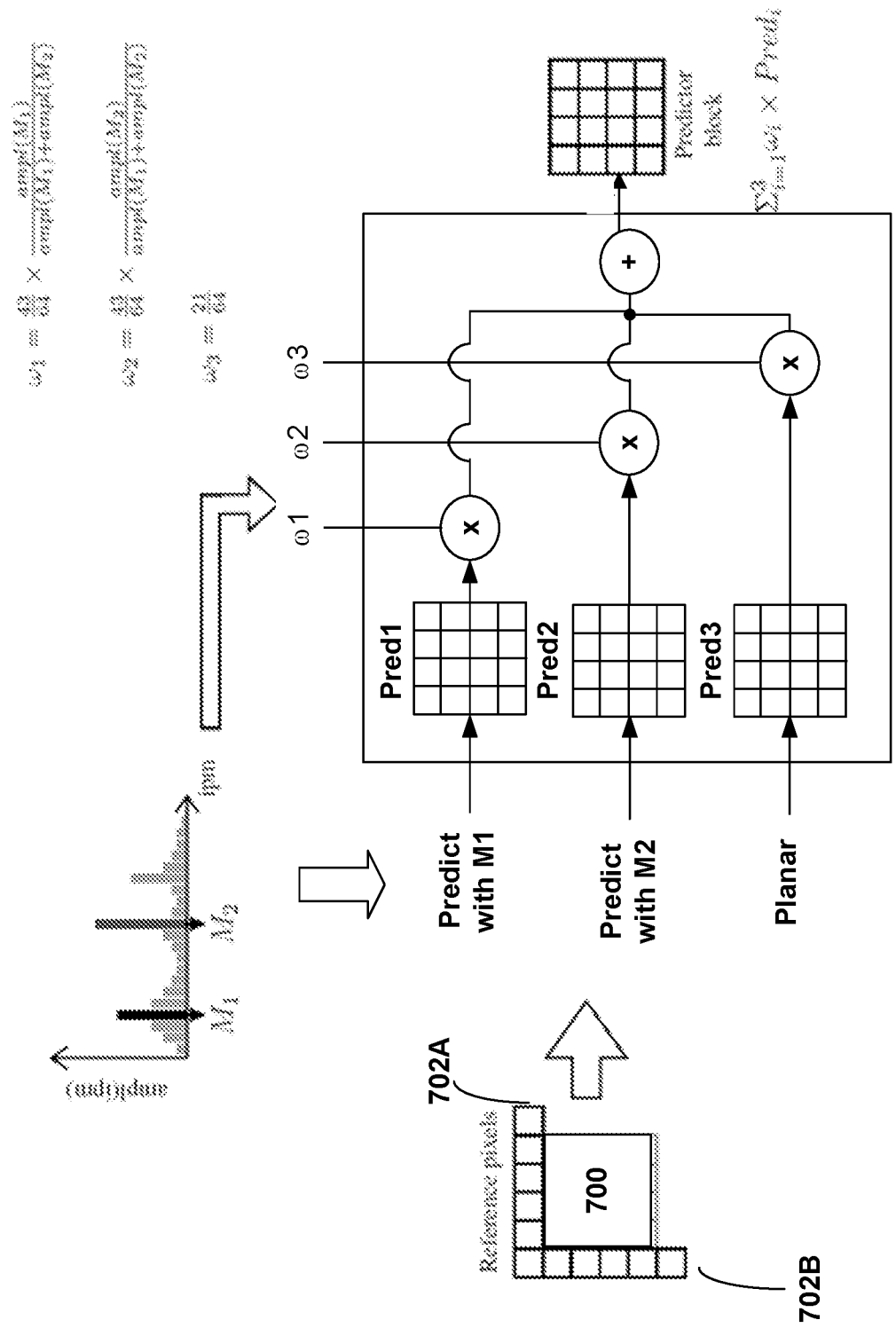
FIG. 7 is a conceptual diagram illustrating a technique of prediction fusion by weighted averaging of two histogram of gradient (HoG) modes and planar.

The following describes most probable modes in intra-prediction for luma components. There are two most probable mode (MPM) lists in ECM. The primary MPM (PMPM) list includes 6 entries and the secondary MPM (SMPM) list includes 16 entries. Video encoder 200 and video decoder 300 may construct a general MPM list with 22 entries. The first 6 entries in this general MPM list are included into the PMPM list, and the rest of entries form the SMPM list. The first entry in the general MPM list may be the Planar mode. The remaining entries are composed of the intra modes in the following order: the intra modes from 5 neighboring blocks, i.e., left (L), above (A), below-left (BL), above-right (AR), and above-left (AL), as shown in FIG. 6, DIMD1 and DIMD2 (i.e., M1 and M2 as indicated in FIG. 7 and described below with respect to decoder side intra mode derivation (DIMD)), the directional modes with added offset from the first two available directional modes of neighboring blocks, and the default modes. That is, for block 600, video encoder 200 and video decoder 300 may construct an intra-prediction mode list based on the example neighboring blocks shown in FIG. 6. If a CU block is vertically oriented, the order of neighboring blocks is A, L, BL, AR, AL; otherwise, it is L, A, BL, AR, AL. A PMPM flag is parsed first, if the flag is true, then a PMPM index is parsed to determine which entry of the PMPM list is selected, otherwise the SMPM flag is parsed to determine whether to parse the SMPM index or the remaining modes.

The following describes decoder side intra mode derivation (DIMD). When DIMD is applied, two intra modes are derived based on Histogram of Gradient (HoG) computation from the reconstructed neighbor samples, and those two predictors are combined with the planar mode predictor with the weights derived from the gradients as described in Abdoli et al. "Non-CE3: Decoder-side Intra Mode Derivation with Prediction Fusion Using Planar" JVET of ITU-T SG 16 WP 3 and ISO/IEC JETC 1/SC 29/WG 11, 15th Meeting: Gothenburg, SE, 3-12 Jul. 2019, JVET-O0449, as shown in FIG. 7. In FIG. 7, block 700 is a current block, and the reference pixels include reference pixels 702A and 702B. A DIMD flag is signaled to indicate if the current CU 700 is predicted based on the fusion of M1, M2 and Planar.

In ECM, DIMD1 and DIMD2, i.e., M1 and M2 in FIG. 7, are included into the MPM list of intra most probable modes (MPM). Accordingly, in one or more examples, video encoder 200 and video decoder 300 may perform the HoG process before the MPM list construction.

Figure 8:
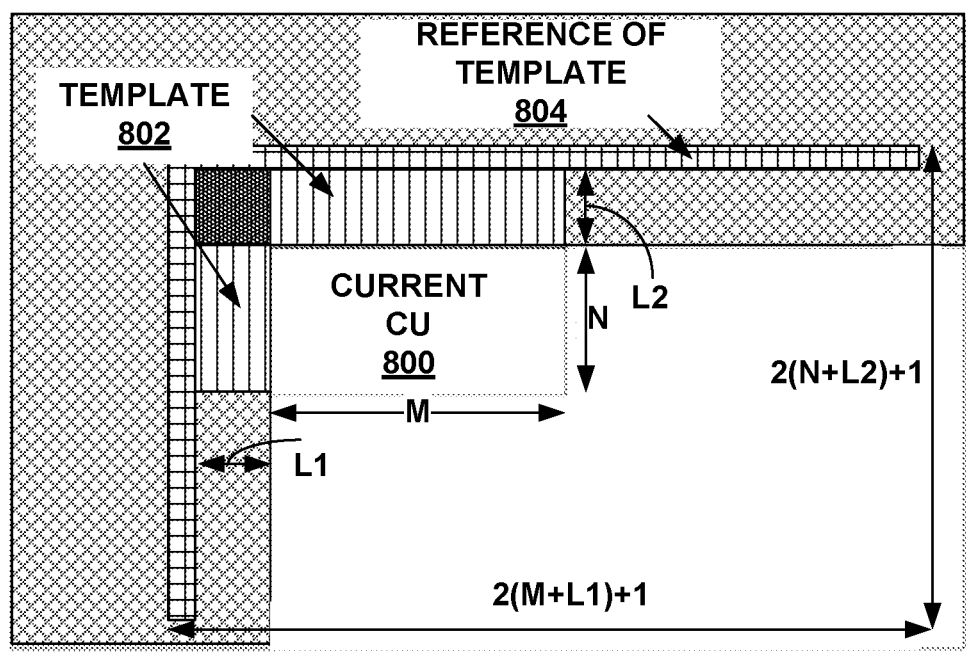
FIG. 8 is a conceptual diagram illustrating an example of a template and reference samples of the template used in template-based intra mode derivation (TIMD).

The following describes template-based intra mode derivation (TIMD). TIMD mode is derived from MPMs using the neighboring template. The TIMD mode is used as an additional intra-prediction technique for a CU. As shown in FIG. 8, the prediction samples for current CU 800 of the template 802 are generated using the reference samples of the template 804 for each MPM mode. A cost is calculated as the sum of absolute transformed differences (SATD) between the prediction and the reconstruction samples of the template. The first two intra prediction modes with the minimum SATD are selected as the TIMD modes, i.e., TIMD1 (the lowest cost costTIMD1) and TIMD2 (the $2^{nd}$ lowest cost costTIMD2). The costs for TIMD1 and TIMD2 are compared to decide how the predictor is generated. If costTIMD2<2*costTIMD2, the predictors, i.e., P_timd, are the fusions of predictors of TIMD1, indicated as Pred1, and predictors of TIMD2, indicated as Pred2, as P_timd=w1*Pred1+w2*Pred2, where w1=costTIMD2/(costTIMD1+costTIMD2) and w2=1−weight1. Otherwise, if costTIMD2≥2*costTIMD2, the predictors are set to be predictors of TIMD1, i.e., P_timd=Pred1.

In some examples, TIMD is derived from MPMs, and MPM includes DIMD1 and DIMD2. Therefore, DIMD1 and DIMD2 are available if TIMD is enabled.

The above example techniques may be considered as intra-prediction modes for luma components. The following describes intra-prediction modes for a chroma component.

In ECM, there are 11 intra modes for chroma intra mode coding, which are categorized into 2 chroma mode lists: a cross-component linear model (CCLM) mode list and a non-CCLM mode list. The CCLM mode list includes six cross-component linear model modes, i.e., LM, and LM_L, LM_A, MMLM, MMLM_L, and MMLM_A. The non-CCLM mode list includes five or six traditional intra modes, e.g., direct mode (DM) and default modes. If one of the default modes, e.g., Planar mode, Horizontal mode, Vertical mode, and DC mode is the same as DM mode, then the default mode is replaced with a Diagonal mode. The signaling for CCLM modes is 00 (LM), 010 (MMLM), 01100 (LM_L), 01101 (LM_A), 01110 (MMLM_L), 01111 (MMLM_A), and the signaling for non-CCLM modes is 10 for DM and 1100, 1101, 1110, and 1111 for the default modes. In other words, the first bin indicates whether the intra-prediction mode is CCLM mode (0) or non-CCLM mode (1). If non-CCLM mode is true (1), a second bin is parsed to indicate whether the intra-prediction mode is DM mode (0) or default mode (1). If default mode is true (1), a 2-bit fix length coding is parsed to indicate which default mode is used.

Figure 9A:
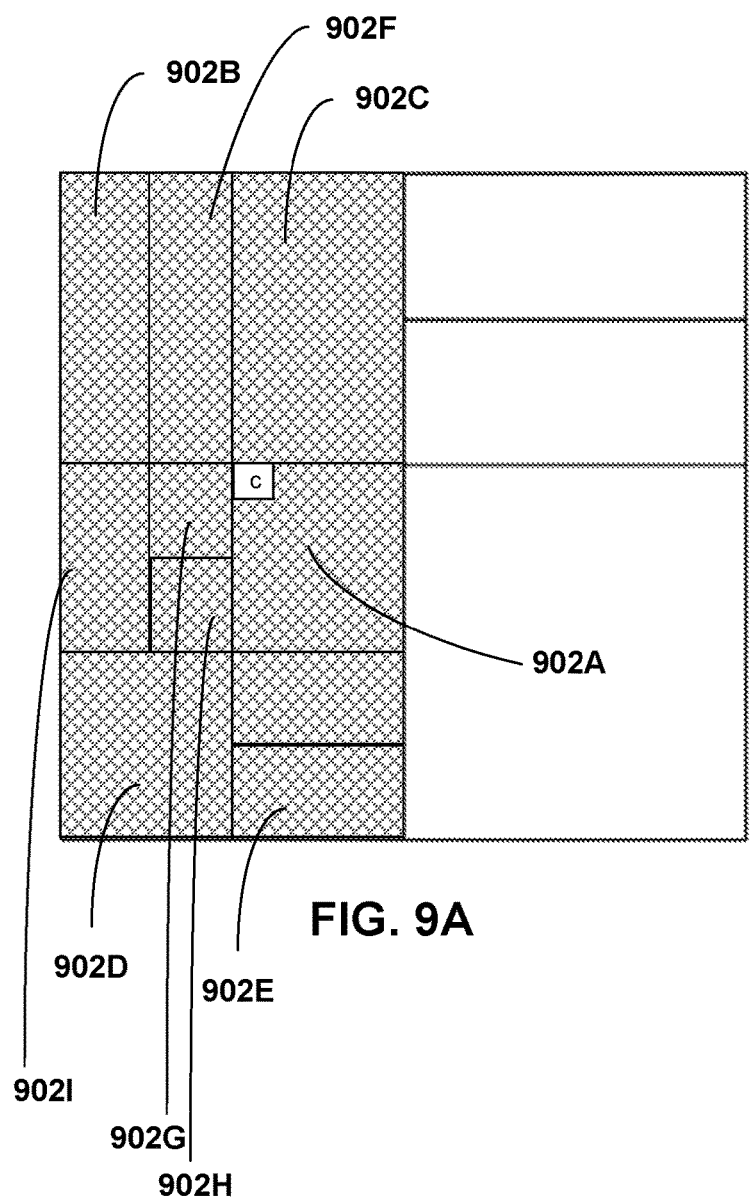
FIGS. 9A and 9B are conceptual diagrams illustrating a luma quad tree binary tree (QTBT) and chroma QTBT structure, respectively, with position in luma coding unit (CU) that is used to derive direct mode (DM).
Figure 9B:
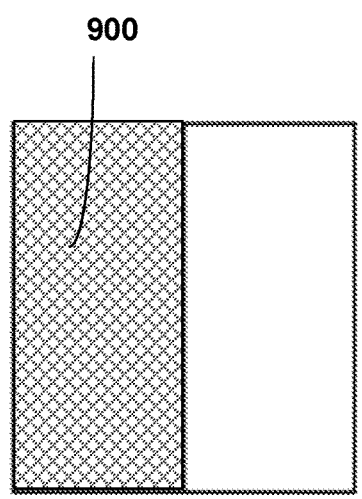

DM mode may directly depend on the intra-prediction mode of the corresponding luma block. Since separate block partitioning structure for luma and chroma components (e.g., luma block 900A and chroma block 900B) is enabled in I slices as shown in FIGS. 9A and 9B, one chroma block may correspond to multiple luma blocks. For example, FIG. 9B illustrates chroma block 900. Chroma block 900 may be co-located with luma blocks 902A-902I of FIG. 9A. Chroma block 900 and luma blocks 902A-902I may be part of the same coding unit (CU). However, due to the different block partitioning of the CU, the CU may be partitioned to include luma blocks 902A-902I, and to include chroma block 900.

Chroma block 900 may be considered as co-located with luma blocks 902A-902I. For example, during display, chroma block 900 may include chroma values for the same number of pixels as luma blocks 902A-902I. There may be other reasons for chroma block 900 and luma blocks 902A-902I to be considered as being co-located.

For Chroma DM mode, the intra-prediction mode of the corresponding luma block covering the center position of the current chroma block is directly inherited. For instance, FIG. 9A illustrates position "c" of luma block 902A as covering the center position of the current chroma block 900. That is, FIGS. 9A and 9B illustrate separate block partitioning structure for luma and chroma components in I slices, where the luma CU covering the position "c" in luma block 902A is used to derive DM mode.

As described in more detail, in one or more examples described in this disclosure, video encoder 200 and video decoder 300 may configured to evaluate more than intra-prediction mode of the center position. For instance, video encoder 200 and video decoder 300 may evaluate the intra-prediction modes of two or more of luma blocks 902A-902I, and determine a first group (e.g., a first group of intra-prediction modes that includes two or more intra-prediction modes from the intra-prediction modes of blocks 902A-902I). Video encoder 200 and video decoder 300 may be configured to add intra-prediction modes from the first group to the list of chroma intra-prediction modes. In some examples, video encoder 200 and video decoder 300 may also derive intra-prediction modes (e.g., by adding or subtracting offset values) from one or more intra-prediction modes in the first group. Video encoder 200 and video decoder 300 may add the derived intra-prediction modes to the list of chroma intra-prediction modes.

The following describes DIMD for chroma component. In Li et al. "Non-EE2: On chroma intra prediction mode" JVET of ITU-T SG 16 WP 3 and ISO/IEC JTC 1/SC 29, 25th Meeting: Teleconference, 12-21 Jan. 2022, JVET-Y0092, a chroma DIMD is proposed on top of ECM to derive a chroma_DIMD mode based on HoG from the collocated (co-located) reconstructed luma samples. A chroma_DIMD flag is signaled after DM flag is signaled. If chroma_DIMD flag is true, then chroma_DIMD mode is derived and used in the current CU. Otherwise, a default mode index is parsed to indicate which default mode is selected.

In accordance with one or more examples described in this disclosure, video encoder 200 and video decoder 300 may construct a non-CCLM mode list with list size denoted as M that is composed of N1 groups of chroma intra modes. The group could be one of the following non-CCLM chroma mode groups (but not limited to the following groups): (1) the chroma modes derived from the intra-prediction modes of co-located luma CUs, (2) the chroma modes derived from the intra-prediction modes of neighboring chroma CUs, (3) the chroma modes derived from the intra-prediction modes of neighboring co-located luma CUs, and (4) the secondary chroma modes derived from the chroma modes currently in the non-CCLM mode list.

For instance, rather than limiting video encoder 200 and video decoder 300 to considering the intra-prediction mode of only one location (e.g., center location of luma block 902A in FIG. 9A), for determining an intra-prediction mode for a chroma block, video encoder 200 and video decoder 300 may construct a list of chroma intra-prediction modes for the chroma block. The list of chroma intra-prediction modes may include intra-prediction modes from different groups. Therefore, the number of intra-prediction modes available to intra-prediction encode or decode the chroma block may be increased, allowing for better compression.

For instance, video encoder 200 and video decoder 300 may determine a first group that includes two or more intra-prediction modes derived from intra-prediction modes of two or more co-located luma blocks that are co-located with the chroma block. Video encoder 200 and video decoder 300 may determine a second group that includes intra-prediction modes based on intra-prediction modes of one or more neighboring chroma blocks, and determine a third group that includes intra-prediction modes based on intra-prediction modes of one or more luma blocks proximate at least one of the two or more co-located luma blocks. Video encoder 200 and video decoder 300 may determine a fourth group that includes one or more intra-prediction modes derived from one or more intra-prediction modes in the first, second, and third groups. For instance, video encoder 200 and video decoder 300 may derive the one or more intra-prediction modes by adding or subtracting an offset to the one or more intra-prediction modes in the first, second, or third groups.

In the above example, the terms "first," "second," "third," and "fourth" groups should not be interpreted to mean an order of the groups or that each of the groups is necessary. Rather the terms "first," "second," "third," and "fourth" groups are used to distinguish between different groups. There may be more, fewer, or different groups than the examples identified as the first, second, third, and fourth groups.

Video encoder 200 and video decoder 300 may add intra-prediction modes from one or more of the first, second, third, and fourth groups to construct the list of chroma intra-prediction modes. For example, video encoder 200 and video decoder 300 may construct a list of chroma intra-prediction modes for a chroma block of a current block of the video data by adding intra-prediction modes of a first group to the list of chroma intra-prediction modes. In one or more examples, the first group includes two or more intra-prediction modes derived from intra-prediction modes of two or more co-located luma blocks of the current block that are co-located with the chroma block. Video encoder 200 and video decoder 300 may similarly add the example second, third, and fourth groups.

In CCLM, video encoder 200 and video decoder 300 may use the sample values of a luma block to determine a prediction block for the chroma block. In one or more examples of intra-prediction modes used to construct the non-CCLM mode list, the actual sample values of the luma block may not be used. Rather, the intra-prediction mode of the co-located luma CUs may be used to derive the intra-prediction modes (e.g., chroma intra modes) that form the non-CCLM mode list.

The example list of chroma intra-prediction modes may be the examples of a non-CCLM mode list or may be part of a larger list that includes non-CCLM modes. For instance, the list of chroma intra-prediction modes excludes CCLM modes.

In some examples, there may be a constraint on the number of chroma modes in the i-th group to be not more than a pre-assigned maximum number of chroma modes for the i-th group, i.e., $n_i$. Stated another way, in one or more examples, there may be a defined maximum number of entries from each of the groups. Video encoder 200 and video decoder 300 may add intra-prediction modes from a group until the maximum number of entries for that group is reached even if there are more intra-prediction modes in the group that could be added. If the maximum size of the list of chroma intra-prediction modes is not reached, then video encoder 200 and video decoder 300 may add intra-prediction modes from another group until the maximum number of entries for that group is reached or the maximum size of the list of chroma intra-prediction modes is reached, and may keep repeating such processes until there are no more groups or the maximum size of the list of chroma intra-prediction modes is reached.

For example, video encoder 200 and video decoder 300 may add intra-prediction modes from the first group to the list of chroma intra-prediction modes based on a maximum number of entries for the first group. Even if there are more intra-prediction modes in the first group, video encoder 200 and video decoder 300 may proceed with adding intra-prediction modes from one of the other groups to the list of chroma intra-prediction modes.

The sum of $n_i$ may be equal to non-CCLM list size M, i.e., $n_1+n_2+ \ldots +n_{N1}=M$. That is, M may be the maximum size of the list of chroma intra-prediction modes. In some examples, the constraint may be the sum of the numbers of chroma modes in the $1^{st}$ group to the i-th group not more than a pre-assigned maximum number of chroma modes for the $1^{st}$ group to the i-th group, i.e., $m_i$. The value of $m_{N1}$ may be equal to M. That is, in some examples, the list of chroma intra-prediction modes may include the intra-prediction modes from the first group, and no other group.

When adding a chroma mode (e.g., intra-prediction mode) of the i-th group into the non-CCLM mode list (e.g., list of chroma intra-prediction modes), video encoder 200 and video decoder 300 may check if the chroma mode (e.g., intra-prediction mode) is already in the non-CCLM mode list (e.g., list of chroma intra-prediction modes). If no, then video encoder 200 and video decoder 300 may add this chroma mode (e.g., intra-prediction mode) into the list of chroma intra-prediction modes. After adding a chroma mode (e.g., intra-prediction mode) into non-CCLM mode list (e.g., list of chroma intra-prediction modes), video encoder 200 and video decoder 300 may check if the number of chroma modes (e.g., intra-prediction modes) of the i-th group (e.g., first, second, third, or fourth) is equal to the pre-assigned maximum number, i.e., $n_i$ or $m_i$. If yes, video encoder 200 and video decoder 300 may stop to add the chroma modes from the i-th group, and move to add the chroma modes of the next group, i.e., (i+1)-th group.

One feature is the first group may always have one chroma mode added into the list since the non-CCLM mode list is empty in the beginning. That is, the list of chroma intra-prediction modes for a chroma block may include at least one intra-prediction mode from the first group (e.g., intra-prediction modes from co-located luma blocks).

As an example, assume that there is a constraint on the sum of the numbers of chroma modes (e.g., sum of the numbers of intra-prediction modes) in the first group to the i-th group as example. Suppose there are three groups (N1=3), non-CCLM list size is 8 (M=8), $m_1$=4, $m_2$=7, and $m_3$=8. Then, in this example, video encoder 200 and video decoder 300 may add at most four chroma modes from the first group into the non-CCLM list, may add at most six chroma modes from the second group (e.g., intra-prediction modes of neighboring chroma blocks) into non-CCLM list, and add at most seven intra-prediction modes from the third group (e.g., intra-prediction modes derived from the intra-prediction modes of luma blocks neighboring the co-located luma blocks) can be added into non-CCLM list.

In some examples, if there are duplicates in a group or among the groups, video encoder 200 and video decoder 300 may add one of the duplicate intra-prediction modes. For example, video encoder 200 and video decoder 300 may add at least one chroma mode from first group into non-CCLM list. However, if all intra-prediction modes in first group are the same, then video encoder 200 and video decoder 300 may add only one chroma mode is into non-CCLM list. As described above, the non-CCLM list is an example of the list of chroma intra-prediction modes.

If the non-CCLM list is not full, default modes are added into the list of chroma intra-prediction modes until the list of chroma intra-prediction modes is full. In one example, the last p entries in the non-CCLM list for the last group, i.e., $N_1$-th group may be kept. Therefore, after adding a chroma mode (e.g., intra-prediction mode) into non-CCLM mode list (e.g., list of chroma intra-prediction modes), video encoder 200 and video decoder 300 may check if the number of intra-prediction modes of the i-th group reaches (M−p). If yes, video encoder 200 and video decoder 300 stops to add the intra-prediction modes from the i-th group, and moves to add the intra-prediction modes from the last group, i.e., $N_1$-th group.

That is, video encoder 200 and video decoder 300 may construct the list of chroma intra-prediction modes (e.g., add one or more intra-prediction modes from a plurality of groups such as the example groups described above). As one example, video encoder 200 and video decoder 300 may construct the list of chroma intra-prediction modes by adding one or more intra-prediction modes from the first group and one or more intra-prediction modes from additional groups (e.g., second, third, and fourth groups). Video encoder 200 and video decoder 300 may determine that a maximum number of entries in the list of chroma intra-prediction modes (e.g., M) minus a number of entries in the list of chroma intra-prediction modes is equal to a number of entries in a last group of the additional groups (p) (e.g., determine if M−p is reached). Based on the determination, video encoder 200 and video decoder 300 may stop adding intra-prediction modes from other groups, and add intra-prediction modes from the last group.

In some examples, a group can be further divided into N2 subgroups. One example in the group is DM modes from different positions, and there are subgroups as follows (but not limited to the following ones): (1) DM modes of the corresponding luma blocks which may use DIMD, TIMD, or other modes, (2) DM modes of the corresponding luma blocks which use DIMD modes, (3) DM modes of the corresponding luma blocks which use TIMD modes. The same constraints as above can be applied to N2 subgroups. For instance, the constraint on the number of chroma modes (e.g., intra-prediction modes) in the j-th subgroup may not be more than a pre-assigned maximum number of chroma modes for the j-th subgroup. The constraint on the sum of the numbers of chroma modes in the first subgroup to the j-th subgroup may not be more than a pre-assigned maximum number of chroma modes for the first group to the j-th group. A constraint may be on keeping the last q entries of the group i for the last subgroup.

For instance, using the constraint on keeping the last q entries of the group i for the last subgroup as example, assume that the group i is the first group with group size of 5, i.e., $n_1$=5. The group is divided into the subgroups, i.e., N2=3. Video encoder 200 and video decoder 300 may keep the last two entries in the group for the last subgroup, i.e., q=2. After adding a chroma mode (e.g., intra-prediction mode) of subgroup j into non-CCLM mode list (e.g., list of chroma intra-prediction modes), video encoder 200 and video decoder 300 may check if the number of chroma modes of the i-th group reaches ($n_1$−q). If yes, video encoder 200 and video decoder 300 stops to add the chroma modes from the subgroup j of the first group, and moves to add the chroma modes from the last subgroup of the first group, i.e., subgroup 3.

The various chroma mode groups (e.g., intra-prediction modes) are described below with respect to a first group: "chroma mode derived from the intra-prediction mode of co-located luma CUs," a second group: "chroma mode derived from the intra prediction mode of neighboring chroma and luma CUs," a third group: "DIMD modes derived from the co-located luma CUs in the collocated luma block," and a fourth group: "secondary chroma modes derived from the current chroma modes in non-CCLM list." The below description related to "combination of chroma mode groups and constraints on maximum number of chroma modes" describes other combinations of mode groups and constraints on the maximum number of chroma modes (e.g., intra-prediction modes) for a group.

Figure 10A:
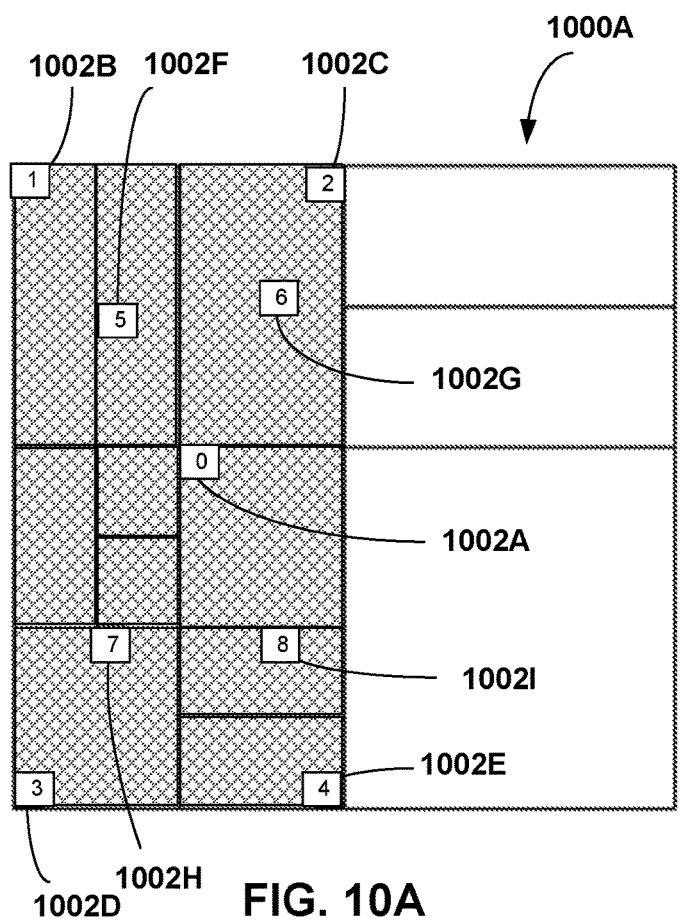
FIGS. 10A and 10B are conceptual diagrams illustrating a luma quad tree binary tree (QTBT) and chroma QTBT structure, respectively, with chroma modes derived from co-located luma CUs corresponding to different positions in chroma CU.
Figure 10B:
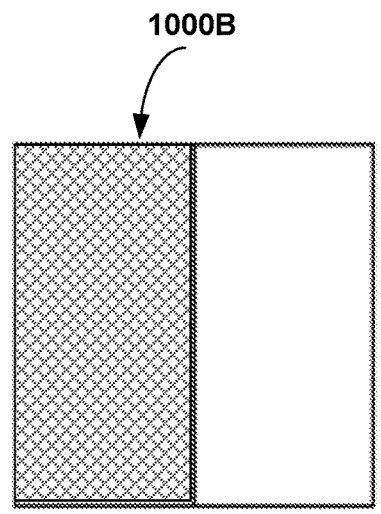

The following describes chroma mode (e.g., intra-prediction mode) derived from the intra-prediction mode of co-located luma CUs. FIGS. 10A and 10B illustrate chroma modes derived from the co-located luma CUs corresponding to different positions in current chroma CU. For instance, FIG. 10A illustrates luma CU 1000A, and FIG. 10B illustrates chroma CU 1000B. FIG. 10A also illustrates different positions 1002A-1002I of luma CU 1000A.

For instance, FIGS. 10A and 10B illustrate an example of a first group of intra-prediction modes. As an example, video encoder 200 and video decoder 300 may construct a list of chroma intra-prediction modes for a chroma block 1000B of a current block of the video data by adding intra-prediction modes of a first group (e.g., from different positions 1002A-1002I) to the list of chroma intra-prediction modes. As illustrated in FIG. 10A, the first group includes two or more intra-prediction modes derived from intra-prediction modes of two or more co-located luma blocks (e.g., the different positions in FIG. 10A are from two or more co-located luma blocks) of the current block that are co-located with the chroma block 1000B.

As illustrated in FIG. 10A, one of the options is position 1002A, similar to center location in luma block 902A of FIG. 9A. However, in the example of FIGS. 10A and 10B, the intra-prediction modes of luma blocks are not limited to center position. Rather, as illustrated in FIG. 10A, there may be a plurality of positions corresponding to two or more co-located luma blocks. Video encoder 200 and video decoder 300 may evaluate the various co-located luma blocks, and the respective example positions illustrated in FIG. 10A, to determine intra-prediction modes. Video encoder 200 and video decoder 300 may add these intra-prediction modes to the list of chroma intra-prediction modes.

The example of FIGS. 10A and 10B illustrate a first group of DM modes. In the DM mode, the intra-prediction mode of a co-located luma block is added as an intra-prediction mode in the list of chroma intra-prediction modes. However, in some examples, video encoder 200 and video decoder 300 may derive an intra-prediction mode that is added to the list of intra-prediction modes based on the intra-prediction mode of the co-located luma block (e.g., by some scaling and/or offsetting).

Five chroma mode groups (e.g., which may be considered as sub-groups of the first group) derived from the intra prediction of the co-located luma CUs are introduced as follows.

(A)—Multiple DM modes: the chroma modes (e.g., intra-prediction modes) that are added to the list of chroma intra-prediction modes) are derived from the intra-prediction modes of the luma blocks corresponding to different positions in current chroma CU as shown in FIG. 10A. The intra-prediction modes of the luma blocks could be Matrix-based intra prediction (MIP), template matching intra prediction (TMP), DIMD, TIMD, Planar mode, DC mode or other angular modes. If luma intra prediction mode is MIP or TMP, the chroma mode (e.g., intra-prediction mode) is set to be Planar mode. Otherwise, the chroma mode is set to be luma intra prediction mode.

(B)—Multiple DM modes using DIMD1: the chroma mode is set to be DIMD1 of a luma CU which is using DIMD or TIMD mode. DIMD1 and DIMD2 may be available when DIMD or TIMD is enabled. The positions of luma CUs correspond to different positions in current chroma CU as shown in FIG. 10A.

(C)—Multiple DM modes using DIMD2: the chroma mode is set to be DIMD2 of a luma CU which is using DIMD or TIMD mode. DIMD1 and DIMD2 may be available when DIMD or TIMD is enabled with ampl(M2) in FIG. 7 being larger than 0. The positions of luma CUs corresponds to different positions in current chroma CU as shown in FIG. 10A.

(D)—Multiple DM modes using TIMD1: the chroma mode is set to be TIMD1 of a luma CU which is using TIMD mode. The positions of luma CUs corresponds to different positions in current chroma CU as shown in FIG. 10A.

(E)—Multiple DM modes using TIMD2: the chroma mode is set to be TIMD2 of a luma CU which is using TIMD mode and whose costTIMD2<2*costTIMD2 is met. The positions of luma CUs corresponds to different positions in current chroma CU as shown in FIG. 10A.

The order of the positions of luma CUs is block 0 1002A to block 8 1002I as shown in FIG. 10A. As one example, the order of positions may be block 0 1002A, and then any order of 4 corners (i.e., block 1 1002B to block 4 1002E), and then any order of 4 centers between center and 4 corners (i.e., block 5 1002F to block 8 1002I). As another example, the order of positions may be block 0 1002A, and then any order of 4 corners (i.e., block 1 1002B to block 4 1002E), and then any order of the other P×P subblocks in luma collocated block (grey area in FIG. 10A), where P could be 4, 8, 16, etc. One example for the order of the other P×P subblocks is from top-left subblock to bottom-right subblock.

Some variants of the chroma mode groups (e.g., sub-group of the first group) based on above may be as follows. Multiple DM modes as described in (A): If the DM of a luma CU corresponding to a position in current chroma CU is already existed in the non-CCLM list, then the chroma mode of the same position is set to be DIMD2 if DIMD2 of the luma CU on the same position is available (the luma CU is using DIMD or TIMD and ampl (M2) of the luma CU is larger than 0). The same replacement method can be applied to multiple DM using DIMD1 or TIMD1 in (B)-(D) to replace DIMD1 or TIMD1 with DIMD2 when DIMD1 or TIMD1 is already existed in the non-CCLM list.

Multiple DM modes as described in (A): If the DM of a luma CU corresponding to a position in current chroma CU is already existed in the non-CCLM list, then the chroma mode of the same position is set to be TIMD2 if TIMD2 of the luma CU on the same position is available (the luma CU is using TIMD and costTIMD2<2*costTIMD2 is met). The same replacement method can be applied to multiple DM using DIMD1 or TIMD1 in (B)-(D) to replace DIMD1 or TIMD1 with TIMD2 when DIMD1 or TIMD1 is already existed in the non-CCLM list.

The following describes chroma mode derived from the intra-prediction mode of neighboring chroma and luma CUs. For instance, a second group may be intra-prediction modes based on intra-prediction modes of one or more neighboring chroma blocks. A third group may be intra-prediction modes based on intra-prediction modes of one or more luma blocks proximate at least one of the two or more co-located luma blocks. FIGS. 11A and 11B illustrate examples of the second group and the third group.

Six chroma mode groups (e.g., sub-groups of the second and third groups) derived from neighboring chroma and luma CUs are introduced as follows. For instance, reference is made to FIGS. 11A and 11B. FIGS. 11A and 11B illustrate chroma modes derived from neighboring chroma and luma CUs. For instance, FIG. 11A illustrates luma CU 1100A having neighboring luma CUs 1104A-1104E, and FIG. 11B illustrates chroma CU 1100B having neighboring chroma CUs 1102A-1102E.

(F)—Neighboring chroma modes: the chroma modes are set to be the intra prediction modes of the neighboring chroma blocks adjacent to current chroma CU. As shown in FIG. 11B, block 0 1102A, block 1 1102B, . . . , and block 4 1120E are the neighboring chroma blocks of chroma CU 1100B. If the intra-prediction mode of a neighboring chroma block is CCLM mode, then video encoder 200 and video decoder 300 bypasses this neighboring chroma block. In some examples, if the intra prediction mode of a neighboring chroma block is CCLM mode, then the chroma mode is set to be Planar mode.

(G)—Neighboring DM modes: the chroma modes are derived from the intra-prediction modes of the luma blocks corresponding to different positions in neighboring chroma blocks. As shown in FIG. 11A, block 5 1104A, block 6 1104B, . . . , and block 9 1104E are the neighboring luma blocks corresponding to block 0 1102A, block 1 1102B, . . . , and block 4 1102E in neighboring chroma blocks. The intra-prediction modes of the luma blocks could be Matrix-based intra prediction (MIP), template matching intra prediction (TMP), DIMD, TIMD, Planar mode, DC mode or other angular modes. If luma intra prediction mode is MIP or TMP, the chroma mode is set to be Planar mode. Otherwise, the chroma mode is set to be luma intra prediction mode.

(H)—Neighboring DM modes using DIMD1: the chroma mode is set to be DIMD1 of a neighboring luma block which is using DIMD or TIMD mode. The positions of luma blocks, i.e., block 5 1104A, block 6 1104B, ..., and block 9 1104E, corresponds to the positions of the neighboring chroma blocks, i.e., block 0 1102A, block 1 1102B, ..., and block 4 1120E, as shown in FIGS. 11A and 11B.

(I)—Neighboring DM modes using DIMD2: the chroma mode is set to be DIMD2 of a neighboring luma block which is using DIMD or TIMD mode and whose ampl (M2) is larger than 0. The positions of luma blocks, i.e., block 5 1104A, block 6 1104B, ..., and block 9 1104E, corresponds to the positions of the neighboring chroma blocks, i.e., block 0 1102A, block 1 1102B, ..., and block 4 1102E, as shown in FIGS. 11A and 11B.

(J)—Neighboring DM modes using TIMD1: the chroma mode is set to be TIMD1 of a neighboring luma block which is using TIMD mode. The positions of luma blocks, i.e., block 5 1104A, block 6 1104B, ..., and block 9 1104E, correspond to the positions of the neighboring chroma blocks, i.e., block 0 1102A, block 1 1102B, ..., and block 4 1120E, as shown in FIGS. 11A and 11B.

(K)—Neighboring DM modes using TIMD2: the chroma mode is set to be TIMD2 of a neighboring luma block which is using TIMD mode and whose costTIMD2<2*costTIMD2 is met. The positions of luma blocks, i.e., block 5 1104A, block 6 1104B, ..., and block 9 1104E, correspond to the positions of the neighboring chroma blocks, i.e., block 0 1102A, block 1 1102B, ..., and block 4 1102E, as shown in FIGS. 11A and 11B.

The order of the positions for neighboring chroma modes in (F) is block 0 1102A to block 4 1102E as shown in FIG. 11B. The order of the positions for neighboring DM modes in (G), (H), ..., and (K) is block 5 1104A to block 9 1104E as shown in FIG. 11A.

Some variants of the chroma mode groups based on (F) to (K) are provided as follows.

Neighboring chroma modes as described in (F): If the intra prediction mode of a neighboring chroma block is already existed in the non-CCLM list (e.g., list of chroma intra-prediction modes), then the chroma mode is set to be neighboring DM modes of the luma block corresponding to the same chroma neighboring block as described in (G). In one example, if the intra prediction mode of a neighboring chroma block is already existed in the non-CCLM list, then the chroma mode is set to be neighboring DM modes using DIMD1, DIMD2, TIMD1, or TIMD2 of the luma block corresponding to the same chroma neighboring block as described in (H), (I), (J), or (K).

Neighboring DM modes as described in (G): If the intra prediction mode of a neighboring luma block already existed in the non-CCLM list, then the chroma mode is set to be neighboring DM modes using DIMD2 or TIMD2 of the same luma block as described in (I) or (K). The same replacement method can be applied to multiple DM using DIMD1 or TIMD1 in (H) and (J) to replace DIMD1 or TIMD1 with DIMD2 or TIMD2 when DIMD1 or TIMD1 is already existed in the non-CCLM list.

The above neighboring mode groups can be enabled in every slice. In some examples, some of neighboring mode groups are enabled in I slice only.

The following describes secondary chroma modes derived from the current chroma modes in non-CCLM list. For instance, as described above, a fourth group may include one or more intra-prediction modes that are derived from one or more of the first, second, or third groups. For instance, deriving the fourth group may include adding or subtracting an offset to the one or more intra-prediction modes in the first, second, and/or third groups.

The first S chroma modes in the non-CCLM mode list are used to derive more chroma modes for this chroma mode group by offsetting the S chroma modes. The first S chroma modes in the non-CCLM mode list (e.g., list of intra-prediction modes) may be intra-prediction modes from the first, the first and second, or the first, second, and third groups in the list of chroma intra-prediction modes.

The maximum offset number could be different for the S chroma modes. An example is shown as follows: Suppose the first three chroma modes (e.g., intra-prediction modes), i.e., S=3, in the non-CCLM list (e.g., list of intra-prediction modes) are used to derive more chroma modes to form a chroma mode group (e.g., the fourth group). The maximum offset numbers are set to be 3, 2 and 1 for $1^{st}$ chroma mode (C1), $2^{nd}$ chroma mode (C2), and 3rd chroma mode (C3), respectively. Then a mode offsetting from C1, C2, or C3, e.g., C1±1, C1±2, C1±3, C2±1, C2±2, and C3±1, is added into the list if the resulting offset mode does not exist in the list of intra-prediction modes. In some examples, Ci may be an angular mode to implement the offsetting. In some examples, the first mode in the non-CCLM mode is DM mode and C1 is the DM mode if DM is an angular mode.

Figure 12B:
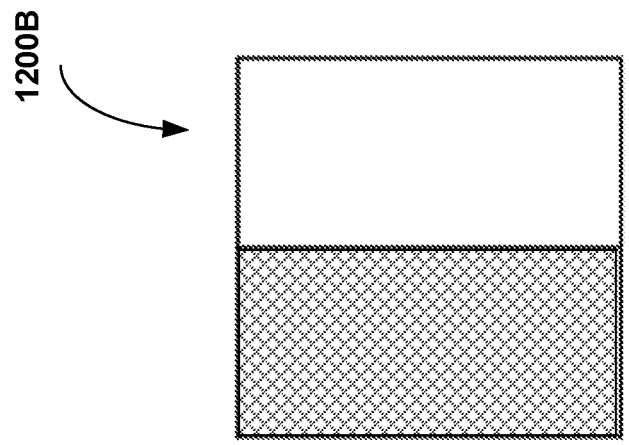
FIGS. 12A and 12B are conceptual diagrams illustrating a luma quad tree binary tree (QTBT) and chroma QTBT structure, respectively, with decoder side intra mode derivation (DIMD) modes derived from luma CUs within co-located luma block corresponding to chroma CU.
Figure 12A:
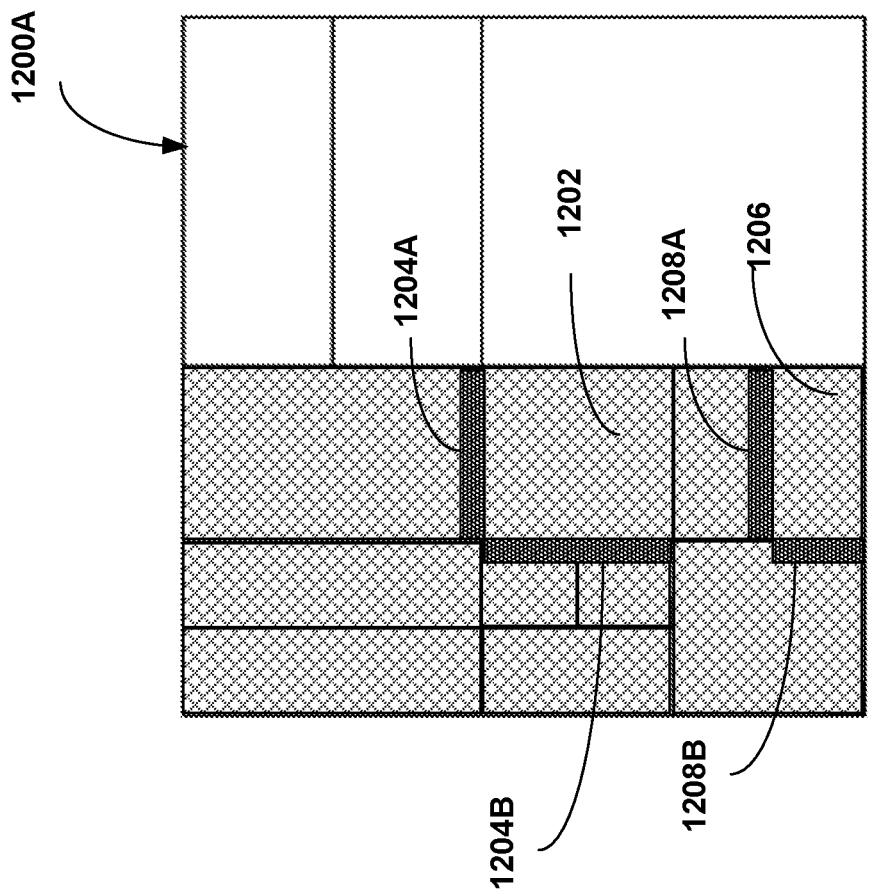

The following describes DIMD modes derived from the co-located luma CUs in the collocated luma block. DIMD modes from different luma CUs, such as the luma CU 1DIMD_i 1202 and luma CU DIMD_j 1206 as shown in FIG. 12A, are used to form a chroma mode group. The DIMD mode in 1DIMD_i 1202 is derived based on the same calculation described with respect to decoder side intra mode derivation (DIMD) described above and with respect to FIG. 7 with the templates of ATemplate_i 1204A and LTemplate_i 1204B. The same calculation for DIMD mode derivation is applied to luma CU 1DIMD_j 1206 with the templates of ATemplate_j 1208A and LTemplate_j 1208B.

The following describes combination of chroma mode groups and constraints on maximum number of chroma modes. Examples to combine the above chroma mode groups with the above constraints on the pre-assigned maximum number of chroma modes is shown as follows.

As Example 1: Suppose non-CCLM list (e.g., list of chroma intra-prediction list) size is 9, i.e., M=9. Suppose there are 3 groups, i.e., N1=3, group 1 is multiple DM modes in (A), group 2 is multiple DM modes using DIMD1 in (B), and group 3 is neighboring chroma modes in (F). The constraints on the sum of the numbers of chroma modes in the $1^{st}$ group to the i-th group not more than a pre-assigned maximum number of chroma modes for the $1^{st}$ group to the i-th group are applied to each group. An example to set the maximum number of group 1 to group i is 5, 3, and 1 for i=1, 2 and 3 respectively, i.e., $m_1=5$, $m_1=3$, $m_1=1$.

A chroma mode group can be formed with at least two of above-mentioned mode groups. One example is a chroma mode group is formed by neighboring chroma modes (F) and secondary chroma mode in the secondary chroma modes derived from the current chroma modes in non-CCLM list as follows: (L)-Hybrid chroma mode group: first add the neighboring chroma modes of different neighboring blocks into the non-CCLM list as indicated in (F). If this group size is not full (not over the maximum number of chroma modes for this group), then add the secondary chroma mode as indicated in secondary chroma modes derived from the current chroma modes in non-CCLM list into the non-CCLM list.

As Example 2: Suppose non-CCLM list (e.g., list of chroma intra-prediction list) size is 9, i.e., M=9. Suppose there are 3 groups, i.e., N1=3, group 1 is multiple DM modes in (A), group 2 is multiple DM modes using DIMD1 in (B), and group 3 is hybrid chroma modes in (L). The constraints on the maximum numbers of chroma modes in each group are applied to each group. An example to set the maximum numbers is 5, 3, and 1 for i=1, 2 and 3 respectively, i.e., $n_1=5$, $n_2=3$, $n_3=1$. Therefore, at most 5 chroma modes from group 1, at most 3 chroma modes from group 2, and at most 1 chroma mode from group 3 are added into non-CCLM list.

The chroma mode groups can have different constraints than the above examples. The following Example 3 describes having different constraints than above examples.

As Example 3: Suppose non-CCLM list size (e.g., list of chroma intra-prediction list) is 9, i.e., M=9. Suppose there are 3 groups, i.e., N1=3, group 1 is multiple DM modes in (A), group 2 is multiple DM modes using DIMD1 in (B), and group 3 is hybrid chroma modes in (L). The constraint on the maximum numbers of chroma modes for the i-th group is applied to group 1 and group 2. Suppose the maximum numbers of chroma modes for group 1 and group 2 are 4 and 3, i.e., $n_1=4$ and $n_1=3$. Instead, the constraint on the sum of the numbers of chroma modes in the group 1 to the group 3 is applied to the group 3. Suppose the sum of the numbers of chroma modes in the group 1 to the group 3 is no more than 8, i.e., $m_3=8$. Therefore, at most 4 chroma modes from group 1 and at most 3 chroma modes from group 2 are added into non-CCLM list. However, at most 7 chroma modes from group 3 can be added into the non-CCLM list when only 1 chroma mode from group 1 is added into the list, and all the derived chroma modes in group 2 have the same chroma mode as the only mode existed in the list. That is, there is only 1 mode in the non-CCLM list, so at most 7 modes from group 3 are allowed added into the list in this case.

Figure 2:
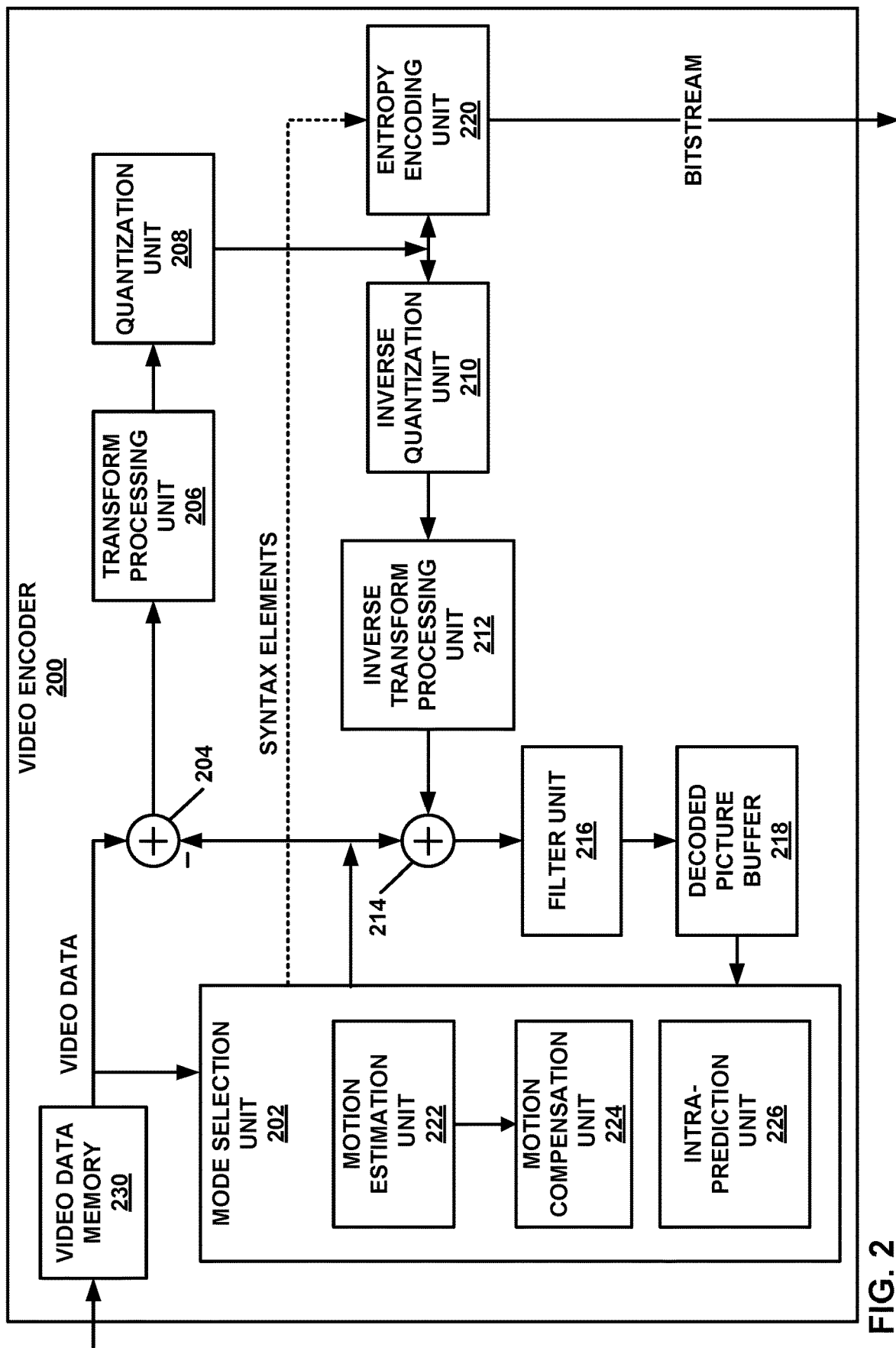
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra-prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In accordance with one or more examples described in this disclosure, intra-prediction unit 226 may be configured to construct a list of chroma intra-prediction modes. The intra-prediction modes in the list of chroma intra-prediction modes may include intra-prediction modes from co-located luma blocks, proximate (e.g., neighboring) luma blocks, and proximate (e.g., neighboring) chroma blocks.

Intra-prediction unit 226 may be considered as constructing the list of chroma intra-prediction modes from one or more groups of intra-prediction modes. In some example techniques, intra-prediction unit 226 may first determine one or more of the groups, and then selectively add intra-prediction modes from the respective groups. However, the example techniques should not be considered as requiring that intra-prediction unit 226 first determine all of the groups or be configured to delineate between groups. Rather, intra-prediction unit 226 may be configured to evaluate intra-prediction modes of co-located luma blocks, proximate (e.g., neighboring) luma blocks, and/or proximate (e.g., neighboring) chroma blocks in an order, and add intra-prediction modes to the list of chroma intra-prediction modes until the list of chroma intra-prediction modes is full or based on some other constraint (e.g., based on number of intra-prediction modes for a group).

As described above, the term "group" is used to differentiate between blocks whose intra-prediction modes are evaluated to construct the list of chroma intra-prediction modes. Although it is possible to determine intra-prediction modes for each of the groups, the term "group" should not be interpreted as requiring, but is possible, that the different intra-prediction modes that are evaluated are delineated into groups.

As one example, intra-prediction unit 226 may construct a list of chroma intra-prediction modes for a chroma block of a current block of the video data, where to construct includes adding intra-prediction modes of a first group to the list of chroma intra-prediction modes. In some examples, the first group includes two or more intra-prediction modes derived from intra-prediction modes of two or more co-located luma blocks of the current block that are co-located with the chroma block. For instance, intra-prediction unit 226 may determine the first group using the examples of FIGS. 10A and 10B.

In some examples, intra-prediction unit 226 may construct the list of chroma inter-prediction modes for the chroma block, where to construct includes adding the intra-prediction modes of the first group to the list of chroma intra-prediction modes, and adding one or more intra-prediction modes of a second group to the list of chroma intra-prediction modes. The second group may include intra-prediction modes based on intra-prediction modes of one or more neighboring chroma blocks (e.g., as illustrated in FIGS. 11A and 11B).

In some examples, intra-prediction unit 226 may construct the list of chroma inter-prediction modes for the chroma block, where to construct includes adding the intra-prediction modes of the first group to the list of chroma intra-prediction modes, and adding one or more intra-prediction modes of a second group to the list of chroma intra-prediction modes. In this example, the second group includes intra-prediction modes based on intra-prediction modes of one or more luma blocks proximate at least one of the two or more co-located luma blocks (e.g., as illustrated in FIGS. 11A and 11B).

As another example, intra-prediction unit 226 may construct the list of chroma inter-prediction modes for the chroma block, where to construct includes adding the intra-prediction modes of the first group to the list of chroma intra-prediction modes, adding one or more intra-prediction modes of a second group to the list of chroma intra-prediction modes, and adding one or more intra-prediction modes of a third group to the list of chroma intra-prediction modes. In this example, the second group includes intra-prediction modes based on intra-prediction modes of one or more neighboring chroma blocks, and the third group includes intra-prediction modes based on intra-prediction modes of one or more luma blocks proximate at least one of the two or more co-located luma blocks (e.g., as illustrated in FIGS. 11A and 11B).

Intra-prediction unit 226 may be configured to derive one or more intra-prediction modes from one or more intra-prediction modes in the first group, second, and/or third group. In some examples, to construct the list of chroma intra-prediction modes, intra-prediction unit 226 may add the derived one or more intra-prediction modes to the list of chroma intra-prediction modes (e.g., in addition to the first, second, and/or third groups). To derive the one or more intra-prediction modes, intra-prediction unit 226 may add or subtract an offset to the one or more intra-prediction modes in the first, second, and/or third groups.

In some examples, intra-prediction unit 226 may determine that a maximum number of entries in the list of chroma intra-prediction modes minus a number of entries in the list of chroma intra-prediction modes is equal to a number of entries in a last group (e.g., fourth group). Intra-prediction unit 226 may, based on the determination, stop adding intra-prediction modes from other groups (e.g., first, second, and/or third groups), and add intra-prediction modes from the last group (e.g., fourth group) even if there are intra-prediction modes remaining in the other groups.

When operating according to the AV1 video coding format, intra-prediction unit 226 may be configured to encode coding blocks of video data (e.g., both luma and chroma coding blocks) using directional intra-prediction, non-directional intra-prediction, recursive filter intra-prediction, chroma-from-luma (CFL) prediction, intra block copy (IBC), and/or color palette mode. Mode selection unit 202 may include additional functional units to perform video prediction in accordance with other prediction modes.

Mode selection unit 202 may determine an intra-prediction mode for the chroma block from the list of chroma intra-prediction modes. For instance, mode selection unit 202 may select an intra-prediction mode that provides the least rate-distortion. In some examples, mode selection unit 202 may cause entropy encoding unit 220 to signal an index into the list of chroma intra-prediction modes so that video decoder 300 can determine the intra-prediction mode from the list of intra-prediction modes that video decoder 300 constructed. That is, video decoder 300 may perform the same operations as video encoder 200 to construct the list of chroma intra-prediction modes so that the list of chroma intra-prediction modes at video encoder 200 and video decoder 300 is the same.

Mode selection unit 202 may encode the chroma block based on the intra-prediction mode. For example, mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU.

Assuming that the size of a particular CU is 2N×2N, video encoder 200 may support PU sizes of 2N×2N or N×N for intra-prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 3:
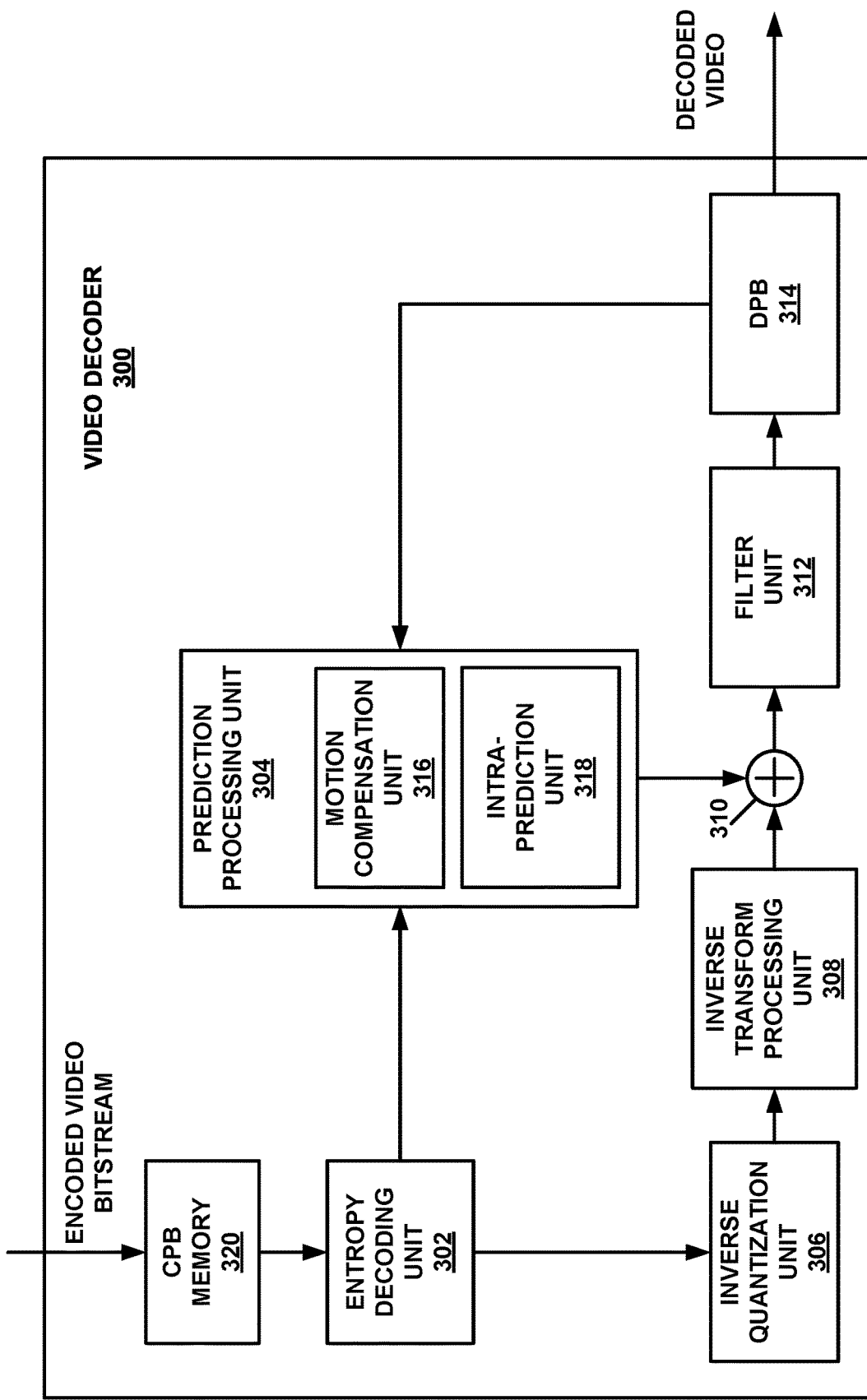
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra-prediction, as described above. Intra-prediction unit 318 may be configured to decode coding blocks of video data (e.g., both luma and chroma coding blocks) using directional intra-prediction, non-directional intra-prediction, recursive filter intra-prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Intra-prediction unit 318 may be considered as constructing the list of chroma intra-prediction modes from one or more groups of intra-prediction modes. In some example techniques, intra-prediction unit 318 may first determine one or more of the groups, and then selectively add intra-prediction modes from the respective groups. However, the example techniques should not be considered as requiring that intra-prediction unit 318 first determine all of the groups or be configured to delineate between groups. Rather, intra-prediction unit 318 may be configured to evaluate intra-prediction modes of co-located luma blocks, proximate (e.g., neighboring) luma blocks, and/or proximate (e.g., neighboring) chroma blocks in an order, and add intra-prediction modes to the list of chroma intra-prediction modes until the list of chroma intra-prediction modes is full or based on some other constraint (e.g., based on number of intra-prediction modes for a group).

As described above, the term "group" is used to differentiate between blocks whose intra-prediction modes are evaluated to construct the list of chroma intra-prediction modes. Although it is possible to determine intra-prediction modes for each of the groups, the term "group" should not be interpreted as requiring, but is possible, that the different intra-prediction modes that are evaluated are delineated into groups.

As one example, intra-prediction unit 318 may construct a list of chroma intra-prediction modes for a chroma block of a current block of the video data, where to construct includes adding intra-prediction modes of a first group to the list of chroma intra-prediction modes. In some examples, the first group includes two or more intra-prediction modes derived from intra-prediction modes of two or more co-located luma blocks of the current block that are co-located with the chroma block. For instance, intra-prediction unit 318 may determine the first group using the examples of FIGS. 10A and 10B.

In some examples, intra-prediction unit 318 may construct the list of chroma inter-prediction modes for the chroma block, where to construct includes adding the intra-prediction modes of the first group to the list of chroma intra-prediction modes, and adding one or more intra-prediction modes of a second group to the list of chroma intra-prediction modes. The second group may include intra-prediction modes based on intra-prediction modes of one or more neighboring chroma blocks (e.g., as illustrated in FIGS. 11A and 11B).

In some examples, intra-prediction unit 318 may construct the list of chroma inter-prediction modes for the chroma block, where to construct includes adding the intra-prediction modes of the first group to the list of chroma intra-prediction modes, and adding one or more intra-prediction modes of a second group to the list of chroma intra-prediction modes. In this example, the second group includes intra-prediction modes based on intra-prediction modes of one or more luma blocks proximate at least one of the two or more co-located luma blocks (e.g., as illustrated in FIGS. 11A and 11B).

As another example, intra-prediction unit 318 may construct the list of chroma inter-prediction modes for the chroma block, where to construct includes adding the intra-prediction modes of the first group to the list of chroma intra-prediction modes, adding one or more intra-prediction modes of a second group to the list of chroma intra-prediction modes, and adding one or more intra-prediction modes of a third group to the list of chroma intra-prediction modes. In this example, the second group includes intra-prediction modes based on intra-prediction modes of one or more neighboring chroma blocks, and the third group includes intra-prediction modes based on intra-prediction modes of one or more luma blocks proximate at least one of the two or more co-located luma blocks (e.g., as illustrated in FIGS. 11A and 11B).

Intra-prediction unit 318 may be configured to derive one or more intra-prediction modes from one or more intra-prediction modes in the first group, second, and/or third group. In some examples, to construct the list of chroma intra-prediction modes, intra-prediction unit 318 may add the derived one or more intra-prediction modes to the list of chroma intra-prediction modes (e.g., in addition to the first, second, and/or third groups). To derive the one or more intra-prediction modes, intra-prediction unit 318 may add or subtract an offset to the one or more intra-prediction modes in the first, second, and/or third groups.

In some examples, intra-prediction unit 318 may determine that a maximum number of entries in the list of chroma intra-prediction modes minus a number of entries in the list of chroma intra-prediction modes is equal to a number of entries in a last group (e.g., fourth group). Intra-prediction unit 318 may, based on the determination, stop adding intra-prediction modes from other groups (e.g., first, second, and/or third groups), and add intra-prediction modes from the last group (e.g., fourth group) even if there are intra-prediction modes remaining in the other groups.

Prediction processing unit 304 may determine an intra-prediction mode for the chroma block from the list of chroma intra-prediction modes. For instance, the list of chroma intra-prediction modes that video encoder 200 and video decoder 300 construct may be the same (e.g., because both used the same process to construct the list of chroma intra-prediction modes). Video encoder 200 may signal an index into the list of chroma intra-prediction modes, and prediction processing unit 304 may select an intra-prediction mode based on the index.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 4:
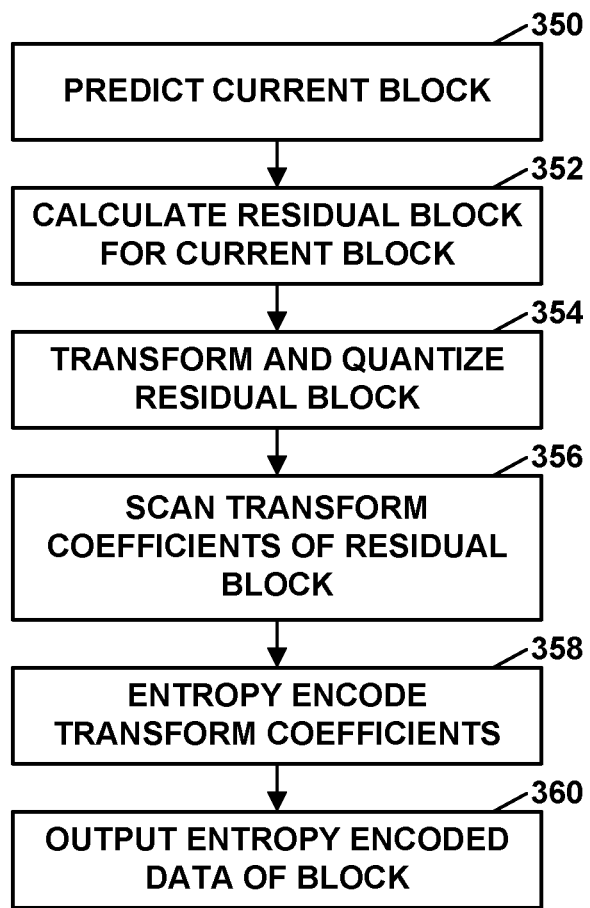
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block using the example techniques described in this disclosure. As one example, video encoder 200 may construct a list of chroma intra-prediction modes using the example techniques described in this disclosure. Video encoder 200 may determine (e.g., select) an intra-prediction mode from the list of chroma intra-prediction modes. That is, the intra-prediction mode that video encoder 200 selects is one of the intra-prediction modes in the list of chroma intra-prediction modes. Video encoder 200 may form the prediction block based on the intra-prediction mode.

Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 5:
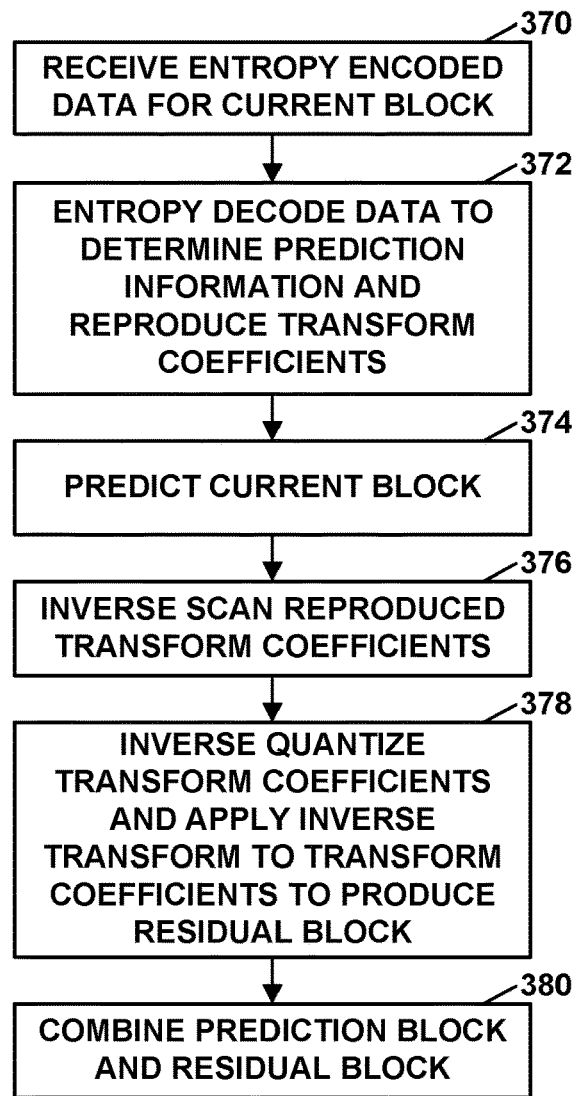
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372).

Video decoder 300 may predict the current block (374), e.g., using an intra- or inter-prediction mode as indicated by the prediction information for the current block, to calculate a prediction block for the current block. For example, video decoder 300 may form a prediction block for the current block using the example techniques described in this disclosure. As one example, video decoder 300 may construct a list of chroma intra-prediction modes using the example techniques described in this disclosure (e.g., so that the list of chroma intra-prediction modes is the same as that of video encoder 200). Video decoder 300 may determine (e.g., select) an intra-prediction mode from the list of chroma intra-prediction modes. For instance, video decoder 300 may receive an index into the list of chroma intra-prediction modes from which video decoder 300 determines the intra-prediction mode. Video decoder 300 may form the prediction block based on the intra-prediction mode.

Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 13:
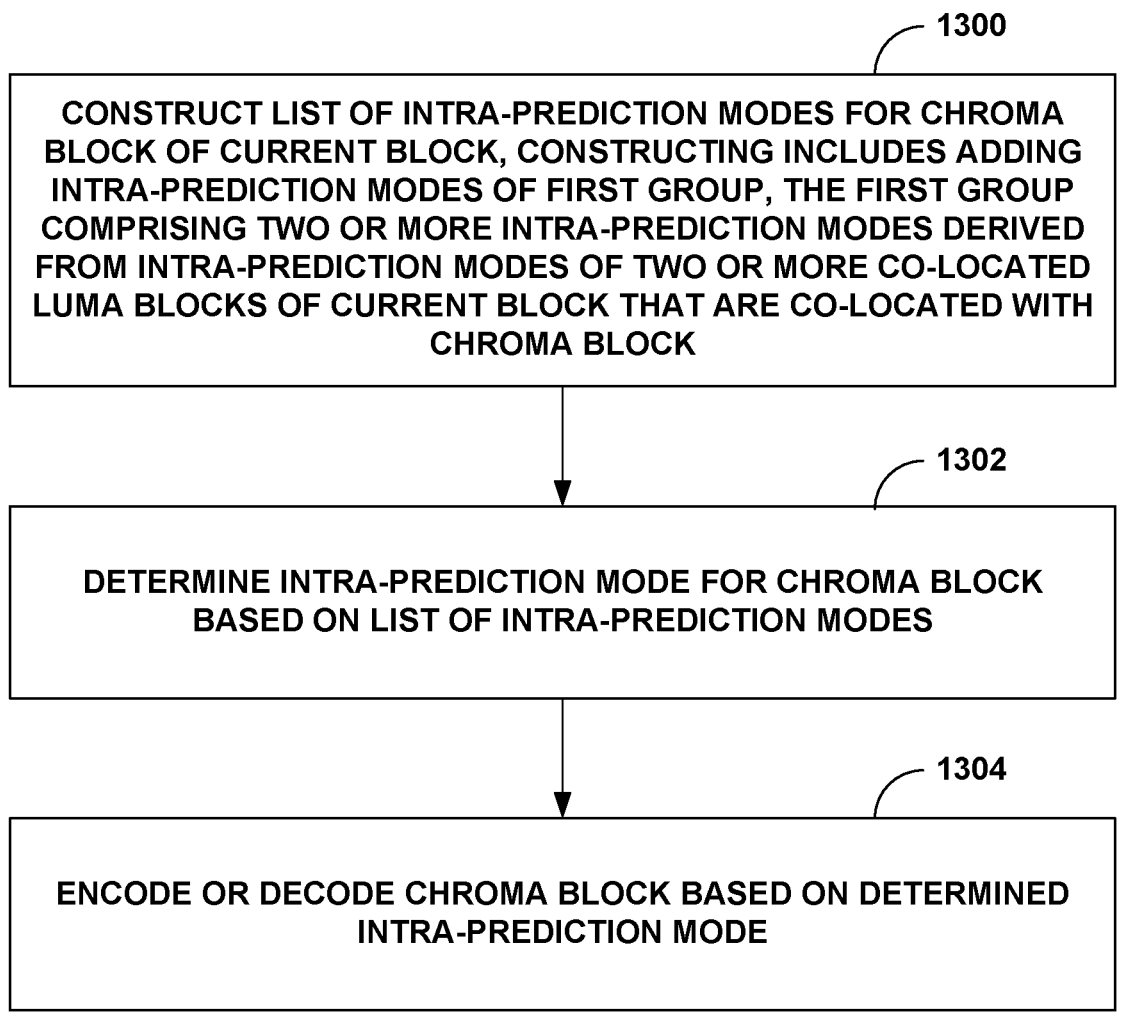
FIG. 13 is a flowchart illustrating an example of encoding or decoding video data.

FIG. 13 is a flowchart illustrating an example of encoding or decoding video data. For ease of description, FIG. 13 is described with respect to processing circuitry of a video coder. Examples of the video coder include video encoder 200 and video decoder 300. In some examples, intra-prediction unit 226 (FIG. 2) and intra-prediction unit 318 (FIG. 3) may be configured to perform the example techniques.

In FIG. 13, the processing circuitry of the video coder may be considered as constructing a list of chroma intra-prediction modes from one or more groups of intra-prediction modes. In some example techniques, the processing circuitry may first determine one or more of the groups, and then selectively add intra-prediction modes from the respective groups. However, the example techniques should not be considered as requiring that the processing circuitry first determine all of the groups or be configured to delineate between groups. Rather, the processing circuitry may be configured to evaluate intra-prediction modes of co-located luma blocks, proximate (e.g., neighboring) luma blocks, and/or proximate (e.g., neighboring) chroma blocks in an order, and add intra-prediction modes to the list of chroma intra-prediction modes until the list of chroma intra-prediction modes is full or based on some other constraint (e.g., based on number of intra-prediction modes for a group).

The processing circuitry of the video coder may construct a list of chroma intra-prediction modes for a chroma block of a current block of the video data, where to construct includes adding intra-prediction modes of a first group to the list of chroma intra-prediction modes (1300). In this example, the first group includes two or more intra-prediction modes derived from intra-prediction modes of two or more co-located luma blocks of the current block that are co-located with the chroma block.

As an example, referring to FIGS. 10A and 10B, there may be a plurality of intra-prediction modes associated with the positions 1002A-1002I that are in two or more co-located luma blocks that are co-located with chroma block 1000B. In one or more examples, the processing circuitry may evaluate the intra-prediction modes for these co-located luma blocks, including at positions that are not at the center (e.g., in addition to or instead of center position in luma block 902A of FIG. 9B).

The processing circuitry may add two or more of these intra-prediction modes to the list of chroma intra-prediction modes until the list of intra-prediction modes is full, or all of the intra-prediction modes of a particular set of co-located luma blocks (e.g., positions) is evaluated. For instance, in FIG. 10B, there are a plurality of positions that are evaluated, and two or more of these positions may be in different co-located luma blocks. Accordingly, the first group may include two or more intra-prediction modes derived from intra-prediction modes of evaluated from two or more positions in co-located luma blocks of the current block that are co-located with the chroma block.

In some examples, there may be additional constraints on adding intra-prediction modes from the first group. For instance, the processing circuitry of the video coder may add intra-prediction modes from the first group to the list of chroma intra-prediction modes based on a maximum number of entries for the first group. As described above, there may more than one group, and there may be maximum entry limits for two or more including each of the groups.

In one or more examples, the list of chroma intra-prediction modes excludes cross-component linear model (CCLM) modes. In some examples, the first group may include a subgroup, and the subgroup includes direct mode (DM) modes of the two or more co-located luma blocks which use one or more of decoder side intra mode derivation (DIMD) and template-based intra mode derivation (TIMD).

In some examples, the processing circuitry of the video coder may derive one or more intra-prediction modes from one or more intra-prediction modes in the first group. The processing circuitry may construct the list of chroma intra-prediction modes (e.g., add intra-prediction modes of the first group and the derived one or more intra-prediction modes to the list of chroma intra-prediction modes). Although described with respect to the first group, the processing circuitry may derive one or more intra-prediction modes from other groups as well, such as the second and third groups described above. Deriving the one or more intra-prediction modes may include adding or subtracting an offset to the one or more intra-prediction modes in the first group and/or the other groups.

In some examples, the processing circuitry of the video coder may determine that a maximum number of entries in the list of chroma intra-prediction modes minus a number of entries in the list of chroma intra-prediction modes is equal to a number of entries in a last group of the additional groups. For example, there may be a plurality of groups whose intra-prediction modes are added to the list of chroma intra-prediction modes. For instance, based on the determination, the processing circuitry may stop adding intra-prediction modes from other groups, and add intra-prediction modes from the last group. In this way, the processing circuitry may ensure that all of the intra-prediction modes from the last group are added.

The processing circuitry of the video coder may determine an intra-prediction mode for the chroma block from the list of chroma intra-prediction modes (1302). For example, from the perspective of video encoder 200, video encoder 200 may evaluate rate-distortion values of intra-prediction mode, and determine an intra-prediction mode that is in the list of chroma intra-prediction modes with least rate-distortion as a way to determine the intra-prediction mode. From the perspective of video decoder 300, video decoder 300 may receive an index into the list of chroma intra-prediction modes that video decoder 300 constructed. From the index, video decoder 300 may determine the intra-prediction mode.

The processing circuitry of the video coder may encode or decode the chroma block based on the intra-prediction mode (1304). As one example, video decoder 300 may determine a prediction chroma block based on the intra-prediction mode, receive residual information indicative of a difference between the prediction chroma block and the chroma block, and reconstruct the chroma block based on the residual information and the prediction chroma block. As another example, video encoder 200 may determine a prediction chroma block based on the intra-prediction mode, generate residual information indicative of a difference between the prediction chroma block and the chroma block, and signal the residual information.

Figure 14:
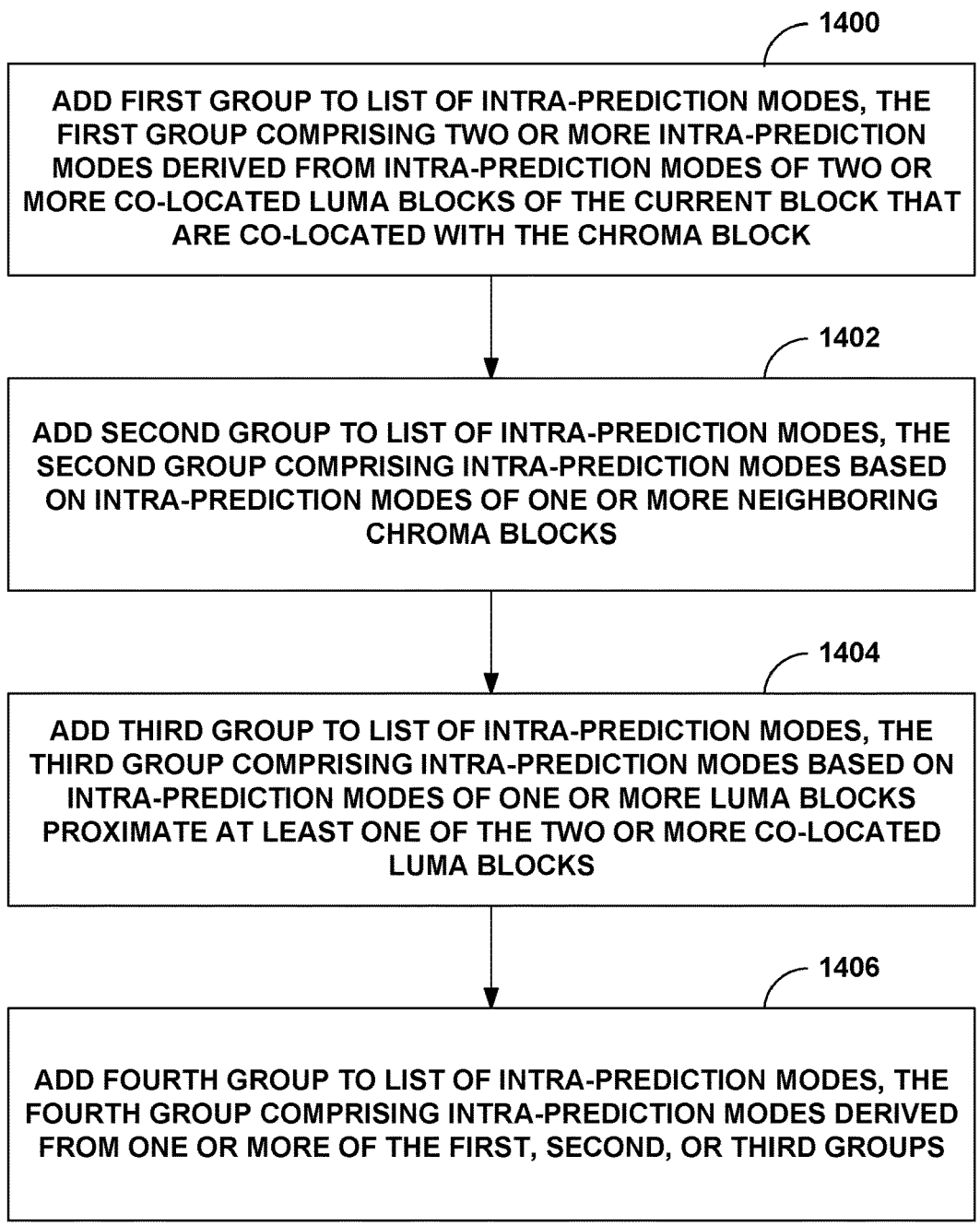
FIG. 14 is another flowchart illustrating an example of constructing a list of chroma intra-prediction modes in accordance with one or more examples described in this disclosure.

FIG. 14 is another flowchart illustrating an example of constructing a list of chroma intra-prediction modes in accordance with one or more examples described in this disclosure. The example of FIG. 14 illustrates an example of processing circuitry of a video coder (e.g., video encoder 200 or video decoder 300) constructing a list of chroma intra-prediction modes. For ease, FIG. 14 is described with the processing circuitry constructing the list of chroma intra-prediction modes from different groups.

However, the example of FIG. 14 should not be considered as limiting. The processing circuitry constructs the list of chroma inter-prediction modes based on co-located luma blocks, proximate luma blocks, and/or proximate chroma blocks. The groups identified as first, second, third, and fourth are provided merely as one example. The groups should not be considered as being required in all examples, or be considered as requiring some ordering. Rather, the groups are used to illustrate where intra-prediction modes are evaluated for adding to the list of chroma intra-prediction modes.

The processing circuitry may add a first group to the list of intra-prediction modes (1400). In this example, the first group includes two or more intra-prediction modes derived from intra-prediction modes of two or more co-located luma blocks (e.g., based on positions defined co-located luma component, such as those illustrated in FIG. 10B) of the current block.

The processing circuitry may add a second group to the list of intra-prediction modes (1402). In this example, the second group includes intra-prediction modes based on intra-prediction modes of one or more neighboring chroma blocks (e.g., as illustrated in FIGS. 11A and 11B).

The processing circuitry may add one or more intra-prediction modes of a third group to the list of chroma intra-prediction modes (1404). In this example, the third group includes intra-prediction modes based on intra-prediction modes of one or more luma blocks proximate at least one of the two or more co-located luma blocks.

In one or more examples, the processing circuitry may also add derived intra-prediction modes. For instance, the processing circuitry may add one or more intra-prediction modes of a fourth group (1406). The fourth group includes intra-prediction modes derived from one or more of the first, second, or third groups. For instance, the fourth group includes derive intra-prediction modes that are derived by adding or subtracting an offset to the one or more intra-prediction modes in the first, second, and/or third groups.

The following example techniques may be performed together or separately.

Clause 1. A method of coding video data, the method comprising: constructing a list of chroma intra-prediction modes for a chroma block of a current block of the video data, wherein the list of chroma intra-prediction modes includes intra-prediction modes from one or more groups, and constructing the list of chroma intra-prediction modes comprises constructing one or more of: a first group comprising intra-prediction modes derived from intra-prediction modes of co-located luma blocks of the current block; a second group comprising intra-prediction modes derived from intra-prediction modes of proximate chroma blocks; a third group comprising intra-prediction modes derived from intra-prediction modes of luma block proximate to co-located luma blocks; and a fourth group comprising one or more of direct mode (DM), Planar mode, Horizontal mode, Vertical mode, DC mode, and Diagonal mode; determining an intra-prediction mode for the chroma block based on intra-prediction modes in the list of chroma intra-prediction modes; and coding the chroma block based on the determined intra-prediction mode.

Clause 2. The method of clause 1, wherein the list of chroma intra-prediction modes excludes cross-component linear model (CCLM) modes.

Clause 3. The method of any of clauses 1 and 2, wherein constructing one or more of the first group, second group, third group, and fourth group comprises constructing one or more of the first group, second group, third group, and fourth group based respective maximum number of entries for each of the first group, second group, third group, and fourth group.

Clause 4. The method of any of clauses 1-3, wherein constructing one or more of the first group, second group, third group, and fourth group comprising constructing one or more subgroups for each of one or more of the first group, second group, third group, and fourth group, wherein constructing one or more of the subgroups comprises constructing one or more of: a subgroup comprising direct mode (DM) modes of corresponding luma blocks which use one or more of decoder side intra mode derivation (DIMD) and template-based intra mode derivation (TIMD).

Clause 5. The method of any of clauses 1-4, wherein coding the chroma block based on the determined intra-prediction mode comprises: determining a prediction chroma block based on the determined intra-prediction mode; receiving residual information indicative of a difference between the prediction chroma block and the chroma block; and reconstructing the chroma block based on the residual information and the prediction chroma block.

Clause 6. The method of any of clauses 1-4, wherein coding the chroma block based on the determined intra-prediction mode comprises: determining a prediction chroma block based on the determined intra-prediction mode; generating residual information indicative of a difference between the prediction chroma block and the chroma block; and signaling the residual information.

Clause 7. A device for coding video data, the device comprising: memory configured to store the video data; and processing circuitry configured to perform the method of any one or combination of clauses 1-6.

Clause 8. The device of clause 7, further comprising a display configured to display decoded video data.

Clause 9. The device of any of clauses 7 and 8, wherein the device comprises one or more of a camera, a computer, a mobile device, a broadcast receiver device, or a set-top box.

Clause 10. The device of any of clauses 7-9, wherein the device comprises a video decoder.

Clause 11. The device of any of clauses 7-10, wherein the device comprises a video encoder.

Clause 12. A computer-readable storage medium having stored thereon instructions that, when executed, cause one or more processors to perform the method of any of clauses 1-6.

Clause 13. A device for coding video data, the device comprising means for performing the method of any of clauses 1-6.

Clause 1A. A method of encoding or decoding video data, the method comprising: constructing a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; determining an intra-prediction mode for the chroma block from the list of chroma intra-prediction modes; and encoding or decoding the chroma block based on the intra-prediction mode.

Clause 2A. The method of clause 1A, further comprising deriving one or more intra-prediction modes from one or more intra-prediction modes in the first group, wherein constructing the list of chroma intra-prediction modes comprises adding intra-prediction modes of the first group and the derived one or more intra-prediction modes to the list of chroma intra-prediction modes.

Clause 3A. The method of clause 2A, wherein deriving the one or more intra-prediction modes comprises adding or subtracting an offset to the one or more intra-prediction modes in the first group.

Clause 4A. The method of any of clauses 1A-3A, wherein adding the intra-prediction modes of the first group to the list of chroma intra-prediction modes comprises adding intra-prediction modes from the first group to the list of chroma intra-prediction modes based on a maximum number of entries for the first group.

Clause 5A. The method of any of clauses 1A-4A, wherein constructing the list of chroma intra-prediction modes comprises: adding the intra-prediction modes of the first group to the list of chroma intra-prediction modes; and adding one or more intra-prediction modes of a second group to the list of chroma intra-prediction modes, the second group comprising intra-prediction modes based on intra-prediction modes of one or more neighboring chroma blocks.

Clause 6A. The method of any of clauses 1A-4A, wherein constructing the list of chroma intra-prediction modes comprises: adding the intra-prediction modes of the first group to the list of chroma intra-prediction modes; and adding one or more intra-prediction modes of a second group to the list of chroma intra-prediction modes, the second group comprising intra-prediction modes based on intra-prediction modes of one or more luma blocks proximate at least one of the two or more co-located luma blocks.

Clause 7A. The method of any of clauses 1A-4A, wherein constructing the list of chroma intra-prediction modes comprises: adding the intra-prediction modes of the first group to the list of chroma intra-prediction modes; adding one or more intra-prediction modes of a second group to the list of chroma intra-prediction modes, the second group comprising intra-prediction modes based on intra-prediction modes of one or more neighboring chroma blocks; and adding one or more intra-prediction modes of a third group to the list of chroma intra-prediction modes, the third group comprising intra-prediction modes based on intra-prediction modes of one or more luma blocks proximate at least one of the two or more co-located luma blocks.

Clause 8A. The method of any of clauses 1A-7A, wherein the list of chroma intra-prediction modes excludes cross-component linear model (CCLM) modes.

Clause 9A. The method of any of clauses 1A-8A, wherein the first group comprises a subgroup comprising direct mode (DM) which directly uses intra-prediction mode of the two or more co-located luma blocks or one or more of decoder side intra mode derivation (DIMD) and template-based intra mode derivation (TIMD) derived from neighboring samples of the two or more co-located luma blocks.

Clause 10A. The method of any of clauses 1A-4A, wherein constructing the list of chroma intra-prediction modes comprises adding one or more intra-prediction modes from the first group and one or more intra-prediction modes from additional groups, the method further comprising: determining that a maximum number of entries in the list of chroma intra-prediction modes minus a number of entries in the list of chroma intra-prediction modes is equal to a number of entries in a last group of the additional groups; and based on the determination, stopping adding intra-prediction modes from other groups, and adding intra-prediction modes from the last group.

Clause 11A. The method of any of clauses 1A-10A, wherein encoding or decoding the chroma block comprises decoding the chroma block, wherein decoding the chroma block comprises: determining a prediction chroma block based on the intra-prediction mode; receiving residual information indicative of a difference between the prediction chroma block and the chroma block; and reconstructing the chroma block based on the residual information and the prediction chroma block.

Clause 12A. The method of any of clauses 1A-10A, wherein encoding or decoding the chroma block comprises encoding the chroma block, wherein encoding the chroma block comprises: determining a prediction chroma block based on the intra-prediction mode; generating residual information indicative of a difference between the prediction chroma block and the chroma block; and signaling the residual information.

Clause 13A. A device for encoding or decoding video data, the device comprising: memory configured to store the video data; and processing circuitry coupled to the memory and configured to: construct a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; determine an intra-prediction mode for the chroma block from the list of chroma intra-prediction modes; and encode or decode the chroma block based on the intra-prediction mode.

Clause 14A. The device of clause 13A, wherein the processing circuitry is configured to derive one or more intra-prediction modes from one or more intra-prediction modes in the first group, wherein to construct the list of chroma intra-prediction modes, the processing circuitry is configured to add intra-prediction modes of the first group and the derived one or more intra-prediction modes to the list of chroma intra-prediction modes.

Clause 15A. The device of clause 14A, wherein to derive the one or more intra-prediction modes, the processing circuitry is configured to add or subtract an offset to the one or more intra-prediction modes in the first group.

Clause 16A. The device of any of clauses 13A-15A, wherein to add the intra-prediction modes of the first group to the list of chroma intra-prediction modes, the processing circuitry is configured to add intra-prediction modes from the first group to the list of chroma intra-prediction modes based on a maximum number of entries for the first group.

Clause 17A. The device of any of clauses 13A-16A, wherein to construct the list of chroma intra-prediction modes, the processing circuitry is configured to: add the intra-prediction modes of the first group to the list of chroma intra-prediction modes; and add one or more intra-prediction modes of a second group to the list of chroma intra-prediction modes, the second group comprising intra-prediction modes based on intra-prediction modes of one or more neighboring chroma blocks.

Clause 18A. The device of any of clauses 13A-16A, wherein to construct the list of chroma intra-prediction modes, the processing circuitry is configured to:
add the intra-prediction modes of the first group to the list of chroma intra-prediction modes; and add one or more intra-prediction modes of a second group to the list of chroma intra-prediction modes, the second group comprising intra-prediction modes based on intra-prediction modes of one or more luma blocks proximate at least one of the two or more co-located luma blocks.

Clause 19A. The device of any of clauses 13A-16A, wherein to construct the list of chroma intra-prediction modes, the processing circuitry is configured to: add the intra-prediction modes of the first group to the list of chroma intra-prediction modes; add one or more intra-prediction modes of a second group to the list of chroma intra-prediction modes, the second group comprising intra-prediction modes based on intra-prediction modes of one or more neighboring chroma blocks; and add one or more intra-prediction modes of a third group to the list of chroma intra-prediction modes, the third group comprising intra-prediction modes based on intra-prediction modes of one or more luma blocks proximate at least one of the two or more co-located luma blocks.

Clause 20A. The device of any of clauses 13A-19A, wherein the list of chroma intra-prediction modes excludes cross-component linear model (CCLM) modes.

Clause 21A. The device of any of clauses 13A-20A, wherein the first group comprises a subgroup comprising direct mode (DM) which directly uses intra-prediction mode of the two or more co-located luma blocks or one or more of decoder side intra mode derivation (DIMD) and template-based intra mode derivation (TIMD) derived from neighboring samples of the two or more co-located luma blocks.

Clause 22A. The device of any of clauses 13A-15A, wherein to construct the list of chroma intra-prediction modes, the processing circuitry is configured to add one or more intra-prediction modes from the first group and one or more intra-prediction modes from additional groups, wherein the processing circuitry is configured to: determine that a maximum number of entries in the list of chroma intra-prediction modes minus a number of entries in the list of chroma intra-prediction modes is equal to a number of entries in a last group of the additional groups; and based on the determination, stop adding intra-prediction modes from other groups, and adding intra-prediction modes from the last group.

Clause 23A. The device of any of clauses 13A-22A, wherein to encode or decode the chroma block, the processing circuitry is configured to decode the chroma block, wherein to decode the chroma block, the processing circuitry is configured to: determine a prediction chroma block based on the intra-prediction mode; receive residual information indicative of a difference between the prediction chroma block and the chroma block; and reconstruct the chroma block based on the residual information and the prediction chroma block.

Clause 24A. The device of any of clauses 13A-22A, wherein to encode or decode the chroma block, the processing circuitry is configured to encode the chroma block, wherein to encode the chroma block, the processing circuitry is configured to: determine a prediction chroma block based on the intra-prediction mode; generate residual information indicative of a difference between the prediction chroma block and the chroma block; and signal the residual information.

Clause 25A. The device of any of clauses 13A-24A, wherein the device comprises one or more of a camera, a computer, a mobile device, a broadcast receiver device, or a set-top box.

Clause 26A. A computer-readable storage medium storing instructions thereon that when executed cause one or more processors to: construct a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; determine an intra-prediction mode for the chroma block from the list of chroma intra-prediction modes; and encode or decode the chroma block based on the intra-prediction mode.

Clause 27A. The computer-readable storage medium of clause 26A further comprising instructions that cause the one or more processors to perform the method of any of clauses 2A-12A.

Clause 28A. A device for encoding or decoding video data, the device comprising means for constructing a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block; means for determining an intra-prediction mode for the chroma block from the list of chroma intra-prediction modes; and means for encoding or decoding the chroma block based on the intra-prediction mode.

Clause 29A. The device of clause 28A further comprising means for performing the method of any of clauses 2A-12A.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
constructing a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block, the constructing further comprising:
  adding one or more intra-prediction modes from the first group and one or more intra-prediction modes from additional groups,
  determining that a maximum number of entries in the list of chroma intra-prediction modes minus a number of entries in the list of chroma intra-prediction modes is equal to a number of entries in a last group of the additional groups; and
  based on the determination, stopping adding intra-prediction modes from other groups, and adding intra-prediction modes from the last group;
determining an intra-prediction mode for the chroma block from the list of chroma intra-prediction modes; and
encoding or decoding the chroma block based on the intra-prediction mode.

2. The method of claim 1, further comprising deriving one or more intra-prediction modes from one or more intra-prediction modes in the first group, wherein constructing the list of chroma intra-prediction modes comprises adding intra-prediction modes of the first group and the derived one or more intra-prediction modes to the list of chroma intra-prediction modes.

3. The method of claim 2, wherein deriving the one or more intra-prediction modes comprises adding or subtracting an offset to the one or more intra-prediction modes in the first group.

4. The method of claim 1, wherein adding the intra-prediction modes of the first group to the list of chroma intra-prediction modes comprises adding intra-prediction modes from the first group to the list of chroma intra-prediction modes based on a maximum number of entries for the first group.

5. The method of claim 1, wherein constructing the list of chroma intra-prediction modes comprises:
  adding the intra-prediction modes of the first group to the list of chroma intra-prediction modes; and
  adding one or more intra-prediction modes of a second group to the list of chroma intra-prediction modes, the second group comprising intra-prediction modes based on intra-prediction modes of one or more neighboring chroma blocks.

6. The method of claim 1, wherein constructing the list of chroma intra-prediction modes comprises:
  adding the intra-prediction modes of the first group to the list of chroma intra-prediction modes; and
  adding one or more intra-prediction modes of a second group to the list of chroma intra-prediction modes, the second group comprising intra-prediction modes based on intra-prediction modes of one or more luma blocks proximate at least one of the two or more co-located luma blocks.

7. The method of claim 1, wherein constructing the list of chroma intra-prediction modes comprises:
  adding the intra-prediction modes of the first group to the list of chroma intra-prediction modes;
  adding one or more intra-prediction modes of a second group to the list of chroma intra-prediction modes, the second group comprising intra-prediction modes based on intra-prediction modes of one or more neighboring chroma blocks; and
  adding one or more intra-prediction modes of a third group to the list of chroma intra-prediction modes, the third group comprising intra-prediction modes based on intra-prediction modes of one or more luma blocks proximate at least one of the two or more co-located luma blocks.

8. The method of claim 1, wherein the list of chroma intra-prediction modes excludes cross-component linear model (CCLM) modes.

9. The method of claim 1, wherein the first group comprises a subgroup comprising direct mode (DM) which directly uses intra-prediction mode of the two or more co-located luma blocks or one or more of decoder side intra mode derivation (DIMD) and template-based intra mode derivation (TIMD) derived from neighboring samples of the two or more co-located luma blocks.

10. The method of claim 1, wherein encoding or decoding the chroma block comprises decoding the chroma block, wherein decoding the chroma block comprises:
  determining a prediction chroma block based on the intra-prediction mode;
  receiving residual information indicative of a difference between the prediction chroma block and the chroma block; and
  reconstructing the chroma block based on the residual information and the prediction chroma block.

11. The method of claim 1, wherein encoding or decoding the chroma block comprises encoding the chroma block, wherein encoding the chroma block comprises:
  determining a prediction chroma block based on the intra-prediction mode;
  generating residual information indicative of a difference between the prediction chroma block and the chroma block; and
  signaling the residual information.

12. A device for encoding or decoding video data, the device comprising:
  memory configured to store the video data; and
  processing circuitry coupled to the memory and configured to:
    construct a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block, wherein to construct the list, the processing circuitry is further configured to:
      add one or more intra-prediction modes from the first group and one or more intra-prediction modes from additional groups and wherein to add one or more intra-prediction modes from the first group and one or more intra-prediction modes from additional groups, the processing circuitry is further configured to:
        determine that a maximum number of entries in the list of chroma intra-prediction modes minus a number of entries in the list of chroma intra-prediction modes is equal to a number of entries in a last group of the additional groups; and
        based on the determination, stop adding intra-prediction modes from other groups, and adding intra-prediction modes from the last group;

determine an intra-prediction mode for the chroma block from the list of chroma intra-prediction modes; and encode or decode the chroma block based on the intra-prediction mode wherein to construct the list of chroma intra-prediction modes, the processing circuitry is configured to add one or more intra-prediction modes from the first group and one or more intra-prediction modes from additional groups.

13. The device of claim 12, wherein the processing circuitry is configured to derive one or more intra-prediction modes from one or more intra-prediction modes in the first group, wherein to construct the list of chroma intra-prediction modes, the processing circuitry is configured to add intra-prediction modes of the first group and the derived one or more intra-prediction modes to the list of chroma intra-prediction modes.

14. The device of claim 13, wherein to derive the one or more intra-prediction modes, the processing circuitry is configured to add or subtract an offset to the one or more intra-prediction modes in the first group.

15. The device of claim 12, wherein to add the intra-prediction modes of the first group to the list of chroma intra-prediction modes, the processing circuitry is configured to add intra-prediction modes from the first group to the list of chroma intra-prediction modes based on a maximum number of entries for the first group.

16. The device of claim 12, wherein to construct the list of chroma intra-prediction modes, the processing circuitry is configured to:
add the intra-prediction modes of the first group to the list of chroma intra-prediction modes; and
add one or more intra-prediction modes of a second group to the list of chroma intra-prediction modes, the second group comprising intra-prediction modes based on intra-prediction modes of one or more neighboring chroma blocks.

17. The device of claim 12, wherein to construct the list of chroma intra-prediction modes, the processing circuitry is configured to:
add the intra-prediction modes of the first group to the list of chroma intra-prediction modes; and
add one or more intra-prediction modes of a second group to the list of chroma intra-prediction modes, the second group comprising intra-prediction modes based on intra-prediction modes of one or more luma blocks proximate at least one of the two or more co-located luma blocks.

18. The device of claim 12, wherein to construct the list of chroma intra-prediction modes, the processing circuitry is configured to:
add the intra-prediction modes of the first group to the list of chroma intra-prediction modes;
add one or more intra-prediction modes of a second group to the list of chroma intra-prediction modes, the second group comprising intra-prediction modes based on intra-prediction modes of one or more neighboring chroma blocks; and
add one or more intra-prediction modes of a third group to the list of chroma intra-prediction modes, the third group comprising intra-prediction modes based on intra-prediction modes of one or more luma blocks proximate at least one of the two or more co-located luma blocks.

19. The device of claim 12, wherein the list of chroma intra-prediction modes excludes cross-component linear model (CCLM) modes.

20. The device of claim 12, wherein the first group comprises a subgroup comprising direct mode (DM) which directly uses intra-prediction mode of the two or more co-located luma blocks or one or more of decoder side intra mode derivation (DIMD) and template-based intra mode derivation (TIMD) derived from neighboring samples of the two or more co-located luma blocks.

21. The device of claim 12, wherein to encode or decode the chroma block, the processing circuitry is configured to decode the chroma block, wherein to decode the chroma block, the processing circuitry is configured to:
determine a prediction chroma block based on the intra-prediction mode;
receive residual information indicative of a difference between the prediction chroma block and the chroma block; and
reconstruct the chroma block based on the residual information and the prediction chroma block.

22. The device of claim 12, wherein to encode or decode the chroma block, the processing circuitry is configured to encode the chroma block, wherein to encode the chroma block, the processing circuitry is configured to:
determine a prediction chroma block based on the intra-prediction mode;
generate residual information indicative of a difference between the prediction chroma block and the chroma block; and
signal the residual information.

23. The device of claim 12, wherein the device comprises one or more of a camera, a computer, a mobile device, a broadcast receiver device, or a set-top box.

24. A non-transitory computer-readable storage medium storing instructions thereon that when executed cause one or more processors to:
construct a list of chroma intra-prediction modes for a chroma block of a current block of the video data, wherein constructing includes adding intra-prediction modes of a first group to the list of chroma intra-prediction modes, the first group comprising two or more intra-prediction modes derived from intra-prediction modes of two or more co-located luma blocks of the current block that are co-located with the chroma block wherein the instructions further cause the processors to:
add one or more intra-prediction modes from the first group and one or more intra-prediction modes from additional groups, and wherein to one or more intra-prediction modes from the first group and one or more intra-prediction modes from additional groups, the instructions further cause the processors to:
determine that a maximum number of entries in the list of chroma intra-prediction modes minus a number of entries in the list of chroma intra-prediction modes is equal to a number of entries in a last group of the additional groups; and
based on the determination, stop adding intra-prediction modes from other groups, and adding intra-prediction modes from the last group;
determine an intra-prediction mode for the chroma block from the list of chroma intra-prediction modes; and
encode or decode the chroma block based on the intra-prediction mode.

* * * * *